US012565336B2

(12) United States Patent
Whelan et al.

(10) Patent No.: US 12,565,336 B2
(45) Date of Patent: Mar. 3, 2026

(54) SATELLITE COVERAGE USING EYE ORBITS

(71) Applicant: THE BOEING COMPANY, Arlington, VA (US)

(72) Inventors: Michael A. Whelan, Rancho Palos Verdes, CA (US); Emily C. Widder, El Segundo, CA (US)

(73) Assignee: THE BOEING COMPANY, Arlington, VA (US)

( * ) Notice: Subject to any disclaimer, the term of this patent is extended or adjusted under 35 U.S.C. 154(b) by 297 days.

(21) Appl. No.: 18/354,121

(22) Filed: Jul. 18, 2023

(65) Prior Publication Data

US 2025/0026494 A1 Jan. 23, 2025

(51) Int. Cl.
*B64G 1/10* (2006.01)
*H04B 7/185* (2006.01)
*H04B 7/195* (2006.01)

(52) U.S. Cl.
CPC ......... *B64G 1/1085* (2013.01); *B64G 1/1007* (2013.01); *H04B 7/18513* (2013.01); *H04B 7/195* (2013.01)

(58) Field of Classification Search
CPC ................ B64G 1/1085; B64G 1/1007; H04B 7/18513; H04B 7/1851; H04B 7/185; H04B 7/18515; H04B 7/18517; H04B 7/18519; H04B 7/18521; H04B 7/195
See application file for complete search history.

(56) References Cited

U.S. PATENT DOCUMENTS

| | | | | |
|---|---|---|---|---|
| 4,809,935 | A | * | 3/1989 | Draim ................... B64G 1/242 |
| | | | | 244/158.4 |
| 5,551,624 | A | | 9/1996 | Horstein et al. |
| 5,999,797 | A | * | 12/1999 | Zancho ............. H04B 7/18539 |
| | | | | 455/12.1 |
| 6,043,788 | A | | 3/2000 | Seavey |
| 6,198,907 | B1 | * | 3/2001 | Torkington ............ H04B 7/195 |
| | | | | 455/12.1 |
| 6,556,808 | B1 | | 4/2003 | De La Chapelle et al. |
| 7,840,180 | B2 | | 11/2010 | Rosen |
| 9,130,270 | B1 | | 9/2015 | Nelson et al. |
| 9,344,182 | B2 | | 5/2016 | Bigras et al. |
| 2001/0000123 | A1 | | 4/2001 | Benjauthrit |
| 2002/0151273 | A1 | | 10/2002 | Marko |
| 2008/0170536 | A1 | | 7/2008 | Marshack et al. |
| 2020/0036437 | A1 | * | 1/2020 | Heiman ................. B64G 1/10 |
| 2020/0327343 | A1 | | 10/2020 | Lund et al. |
| 2024/0205874 | A1 | | 6/2024 | Xiong |

\* cited by examiner

*Primary Examiner* — Keith Ferguson
(74) *Attorney, Agent, or Firm* — Moore IP Law

(57) ABSTRACT

A system includes a set of satellites in orbits having transits across the sky. Two or more such transits are arranged to intersect to form a closed loop. Movement of the satellites along their respective transits causes, at each intersection of the closed loop, two or more satellites of the set of satellites to be distanced from each other in a manner that enables coverage of the two or more satellites by a single beam of an antenna that tracks one of the satellites.

20 Claims, 13 Drawing Sheets

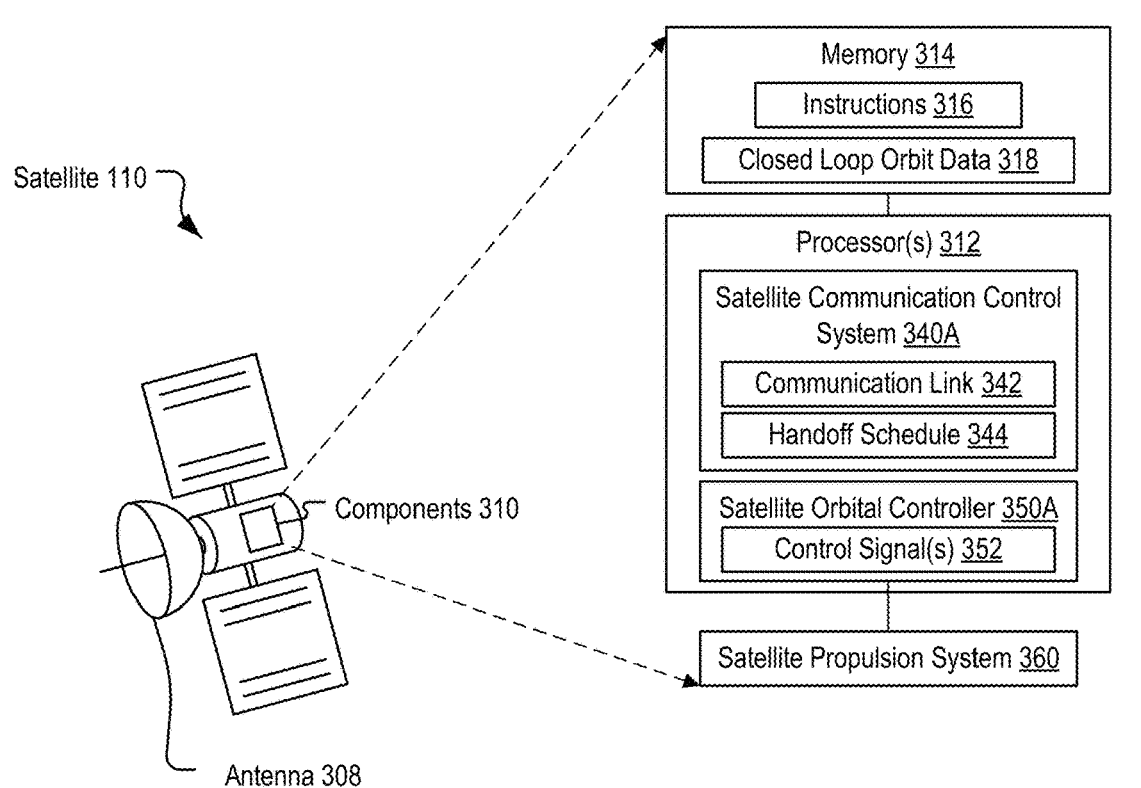
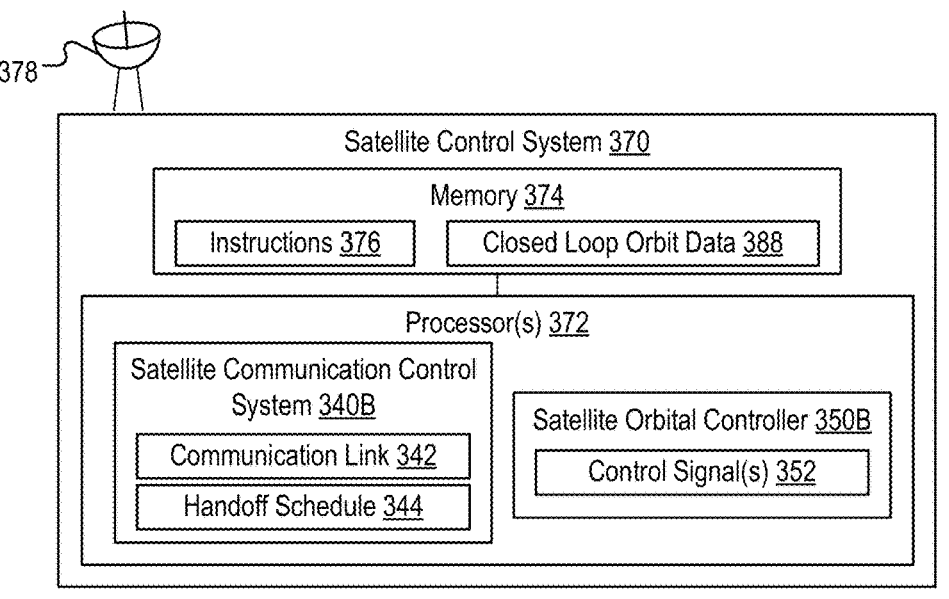
FIG. 3

1000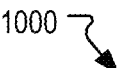

┌─ 1002
CAUSE A SECOND SATELLITE OF A SET OF SATELLITES IN ORBITS HAVING TRANSITS ACROSS THE SKY TO RECEIVE A HANDOFF OF A COMMUNICATION LINK FROM A FIRST SATELLITE OF THE SET OF SATELLITES, WHERE THE TRANSITS ARE ARRANGED TO INTERSECT TO FORM A CLOSED LOOP, AND WHERE THE COMMUNICATION LINK IS HANDED OFF UPON THE FIRST SATELLITE EXITING THE CLOSED LOOP AT A FIRST INTERSECTION AND THE SECOND SATELLITE ENTERING THE CLOSED LOOP AT THE FIRST INTERSECTION

┌─ 1004
CAUSE THE SECOND SATELLITE TO HAND OFF THE COMMUNICATION LINK TO A THIRD SATELLITE OF THE SET OF SATELLITES UPON THE SECOND SATELLITE EXITING THE CLOSED LOOP AT A SECOND INTERSECTION AND THE THIRD SATELLITE ENTERING THE CLOSED LOOP AT THE SECOND INTERSECTION

FIG. 10

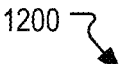

1200

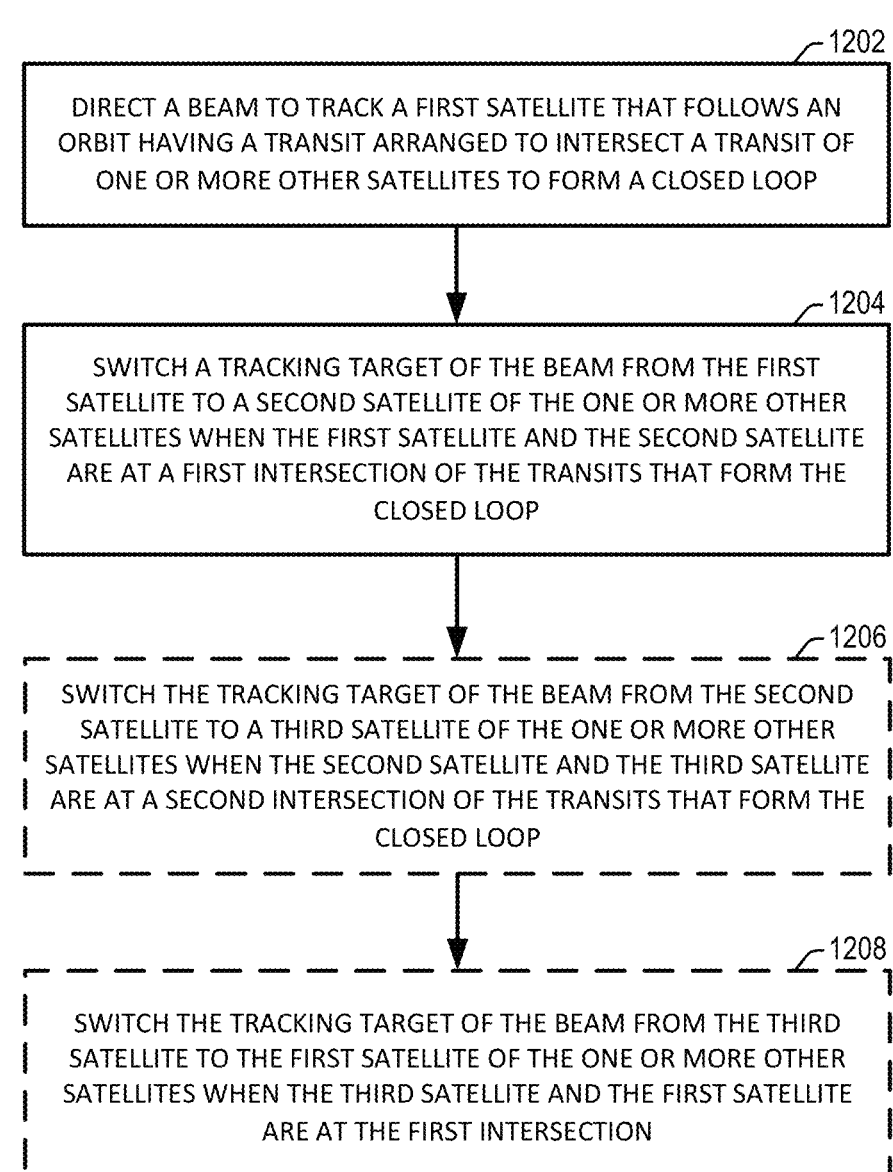

1202

DIRECT A BEAM TO TRACK A FIRST SATELLITE THAT FOLLOWS AN ORBIT HAVING A TRANSIT ARRANGED TO INTERSECT A TRANSIT OF ONE OR MORE OTHER SATELLITES TO FORM A CLOSED LOOP

1204

SWITCH A TRACKING TARGET OF THE BEAM FROM THE FIRST SATELLITE TO A SECOND SATELLITE OF THE ONE OR MORE OTHER SATELLITES WHEN THE FIRST SATELLITE AND THE SECOND SATELLITE ARE AT A FIRST INTERSECTION OF THE TRANSITS THAT FORM THE CLOSED LOOP

1206

SWITCH THE TRACKING TARGET OF THE BEAM FROM THE SECOND SATELLITE TO A THIRD SATELLITE OF THE ONE OR MORE OTHER SATELLITES WHEN THE SECOND SATELLITE AND THE THIRD SATELLITE ARE AT A SECOND INTERSECTION OF THE TRANSITS THAT FORM THE CLOSED LOOP

1208

SWITCH THE TRACKING TARGET OF THE BEAM FROM THE THIRD SATELLITE TO THE FIRST SATELLITE OF THE ONE OR MORE OTHER SATELLITES WHEN THE THIRD SATELLITE AND THE FIRST SATELLITE ARE AT THE FIRST INTERSECTION

FIG. 12

SATELLITE COVERAGE USING EYE ORBITS

FIELD OF THE DISCLOSURE

The present disclosure is generally related to providing satellite coverage using a set of satellites.

BACKGROUND

Satellites have been placed into various orbits about the Earth to achieve a variety of useful objectives. For instance, by placing a satellite in a circular orbit above the equator at a radius approximately 42,000 kilometers (km) from the Earth's center, the satellite will revolve around the equator at the same angular rate that the Earth spins on its axis. The satellite thus appears stationary to observers on the ground below. The geostationary orbit has frequently been used in satellite applications because of its unique convenience—that ground antennas do not have to change the direction they point to maintain communications links with a satellite. However, geostationary orbits also have several disadvantages. One particular disadvantage is that satellites in geostationary orbit cannot be seen by ground stations in high latitudes (beyond about 65° North and 65° South). Similarly, communication between certain moderately separated mid-latitude points, for example Fairbanks, Alaska and Moscow, Russia (which are only about 6,500 km apart) is not practical from geostationary orbit because no geostationary longitude geometry suitably sees both cities. Instead, geostationary links favor locations nearer in longitude. For example, links between Fairbanks and the Falkland Islands are easily connected via geostationary relay even though they are separated by some 15,000 km.

Because geostationary links favor equatorial latitudes over polar latitudes, having the ability to establish satellite links directly over the poles would be useful, especially over the north pole due to the large land masses and high populations in the northern hemisphere. Since Keplerian laws of motion do not permit a satellite to sit stationary over the north pole, several satellite techniques have been developed for circumpolar communication.

Two of the more commonly used polar satellite orbits are the Molniya orbits and the Tundra orbits. Both of these orbits tilt the orbit inclination 63.4 degrees while increasing the orbit eccentricity to elongate the orbit's apogee in the northern hemisphere. This makes the satellites appear to dwell at apogee and spend more time at the northernmost latitudes than at southern ones. Although these satellite do not appear motionless indefinitely, multiple satellites (typically two or three) can be used to maintain a more-or-less continuous presence over a particular northern latitude point. However, ground stations participating in this strategy are disadvantaged by having to simultaneously track multiple satellites, such as by using two or more antennas or a multi-beam antenna, and switching between the tracked satellites at precise intervals before each satellite dips below the horizon in completion of its orbit. Alternatively, a ground station that uses a single-beam antenna would have to break communication with a satellite that is about to dip below the horizon, slew the antenna across the sky, and begin a search for a next satellite entering the field of view before the communication link can be restored.

In addition, satellites that are designed for geostationary orbit applications are sized (for example, antenna beamwidths and steering angles) to cover the Earth from geostationary altitude. As compared to geostationary orbit, the Tundra orbit apogee has a higher altitude, which makes the Earth appear smaller than from geostationary orbit, while the Molniya orbit apogee has a lower altitude, which makes the Earth appear larger than from geostationary orbit. Thus, existing satellites designed for use in geostationary orbit cannot be used in the Tundra or Molniya orbits without redesign.

An improved technique for providing satellite coverage for polar regions is needed.

SUMMARY

One aspect of the subject matter disclosed in detail below is a system that includes a set of satellites in orbits having transits across the sky. Two or more such transits are arranged to intersect to form a closed loop. Movement of the satellites along their respective transits causes, at each intersection of the closed loop, two or more satellites of the set of satellites to be distanced from each other in a manner that enables coverage of the two or more satellites by a single-beam of an antenna that tracks one of the satellites.

Another aspect of the subject matter disclosed in detail below is a device that includes a satellite orbital controller configured to generate control signals to cause a satellite to follow an orbit having a transit arranged to intersect a transit of one or more other satellites to form a closed loop and, at each intersection of the transits that form the closed loop, the satellite is distanced from another satellite in a manner that enables coverage by a single-beam of an antenna that tracks the satellite as it travels along the closed loop. The device also includes a satellite communication control system configured to control communications according to a handoff schedule associated with the satellite entering or exiting the closed loop.

Another aspect of the subject matter disclosed in detail below is a method of providing polar coverage that includes causing a second satellite of a set of satellites in orbits having transits across the sky to receive a handoff of a communication link from a first satellite of the set of satellites. The transits are arranged to intersect to form a closed loop. The communication link is handed off upon the first satellite exiting the closed loop at a first intersection and the second satellite entering the closed loop at the first intersection. The method also includes causing the second satellite to hand off the communication link to a third satellite of the set of satellites upon the second satellite exiting the closed loop at a second intersection and the third satellite entering the closed loop at the second intersection.

Another aspect of the subject matter disclosed in detail below is a device that includes an antenna controller configured to direct a beam to track a first satellite that follows an orbit having a transit arranged to intersect a transit of one or more other satellites to form a closed loop. The antenna controller is also configured to switch a tracking target of the beam from the first satellite to a second satellite of the one or more other satellites when the first satellite and the second satellite are at a first intersection of the transits that form the closed loop.

Another aspect of the subject matter disclosed in detail below is a method of obtaining polar coverage that includes directing, at an antenna controller, a beam to track a first satellite that follows an orbit having a transit arranged to intersect a transit of one or more other satellites to form a closed loop. The method also includes switching, at the antenna controller, a tracking target of the beam from the first satellite to a second satellite of the one or more other satellites when the first satellite and the second satellite are at a first intersection of the transits that form the closed loop.

Another aspect of the subject matter disclosed in detail below is a non-transitory computer-readable medium that includes instructions that, when executed by one or more processors, cause the one or more processors to direct a beam to track a first satellite that follows an orbit having a transit arranged to intersect a transit of one or more other satellites to form a closed loop. The instructions, when executed by the one or more processors, also cause the one or more processors to switch a tracking target of the beam from the first satellite to a second satellite of the one or more other satellites when the first satellite and the second satellite are at a first intersection of the transits that form the closed loop.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 3 is a diagram of components configured to provide satellite coverage using the system of FIG. 1, in accordance with some examples of the present disclosure.

FIG. 10 is a flowchart illustrating an example of a method of providing polar coverage using the system of FIG. 1.

FIG. 12 is a flowchart illustrating an example of a method of obtaining polar coverage using the system of FIG. 1.

DETAILED DESCRIPTION

Figure 1:
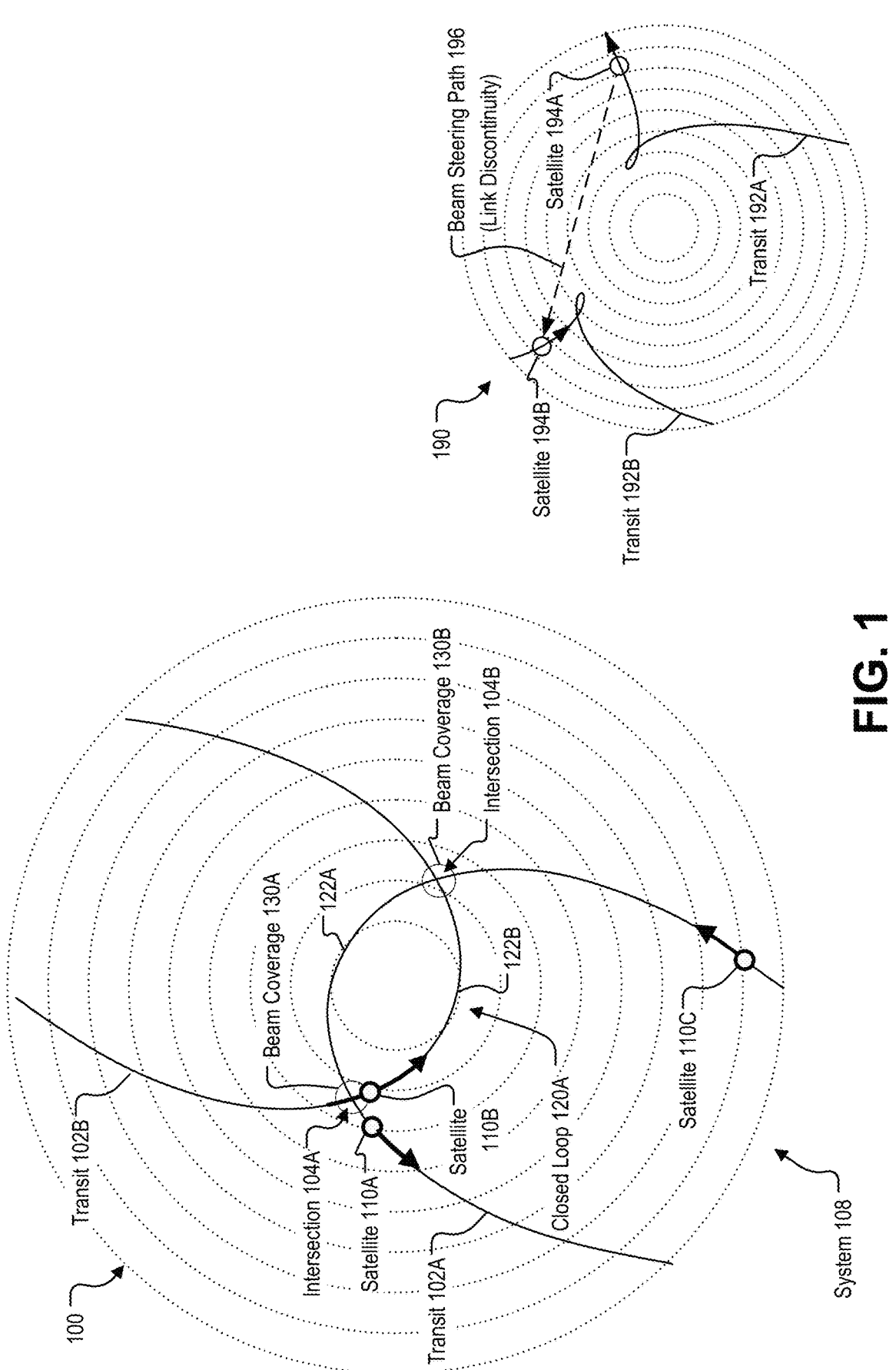
FIG. 1 is a diagram that illustrates a set of satellites of a system configured to provide coverage using orbits having transits that intersect to form a closed loop.

Aspects disclosed herein present systems and methods for providing satellite service to regions of an orbited body, such as polar latitudes of Earth, using satellites in orbits having transits that intersect to form a closed loop. Conventional techniques for providing satellite coverage to polar latitudes, such as using Molniya and Tundra orbits, require ground stations to switch between multiple satellites by either using two or more antennas or a multi-beam antenna to track multiple satellites, or by using a single-beam antenna that breaks communication with one satellite while the antenna is redirected to locate a next satellite, after which the communication link can be restored.

The present disclosure describes techniques for providing satellite coverage for polar regions that can be used by a ground station with a single-beam antenna with little or no communication link discontinuity, enabling improved communications, lower cost, reduced complexity, or a combination thereof. By using satellites in orbits having transits that intersect to form a closed loop, satellite coverage can be provided to a ground station that uses a single-beam antenna to track satellites travelling along the closed loop and switch between satellites with little or no interruption of communication links. Thus, the disclosed systems and methods enable more efficient and/or more effective satellite communications. Using a polar orbit where the apogee is approximately the same altitude as geostationary orbit provides the benefit that satellites designed for geostationary implementations would not need to be significantly redesigned for polar service.

According to an example, a satellite system includes multiple satellites in orbits having transits that intersect each other to form a closed loop. Such orbits can be referred to as "eye" orbits due to the shape of the closed loop resembling a human eye in some three-satellite configurations, although the shape of the closed loop can have a different shape in other configurations. To illustrate, eye orbits used in other configurations can have transits that intersect to form closed loops that are roughly triangular or square-shaped, as non-limiting examples.

The locations of the satellites in their respective orbits are configured such that, when one satellite following a first transit is entering the closed loop at an intersection of the first transit with a second transit, another satellite following the second transit exits the closed loop at the same intersection at substantially the same time. Thus, a single-beam antenna can be used to track satellites travelling along the closed loop, and switching between satellites can be performed at the intersections of the transits when a tracked satellite exits the closed loop concurrently with another satellite entering the closed loop. The satellites can be arranged such that the satellite entering the closed loop and the satellite exiting the closed loop are sufficiently close to each other at the intersection to both be within the coverage of the antenna beam. In addition, according to some implementations, the eye orbit apogee has an altitude that is sufficiently similar to that of a geostationary orbit to enable components designed for geostationary orbit to be used for eye orbits without substantial redesign.

One particular technical advantage provided by the disclosed techniques is that a system of orbital satellites having good visibility into the northern hemisphere of the Earth, where the satellites are in orbits having transits that intersect to form a closed loop and the satellites are arranged such that a satellite entering the closed loop at an intersection of the transits and a satellite exiting the closed loop at the intersection are sufficiently close to each other at the intersection to both be within the coverage of an antenna beam, enables continuous service to be achieved at points on the Earth (e.g., in the northern hemisphere) using a single-beam ground antenna. The disclosed techniques thus enable communication satellites to provide service to polar latitudes in a manner that has advantages to both ground stations and space stations due to reduced complexity, improved effectiveness, and relative low cost as compared to conventional methods.

Specific examples are illustrated in the figures and the following description. All of the figures are covered by the present solution with features common across the various figures. The figures include multiple examples of different types of orbits that are possible in conjunction with the present solution. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular examples are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple satellites are illustrated and associated with reference numbers 110A, 110B, and 110C. When referring to a particular one of these satellites, such as the satellite 110A, the distinguishing letter "A" is used. However, when referring to any arbitrary one of these satellites or to these satellites as a group, the reference number 110 is used without a distinguishing letter.

Figure 2:
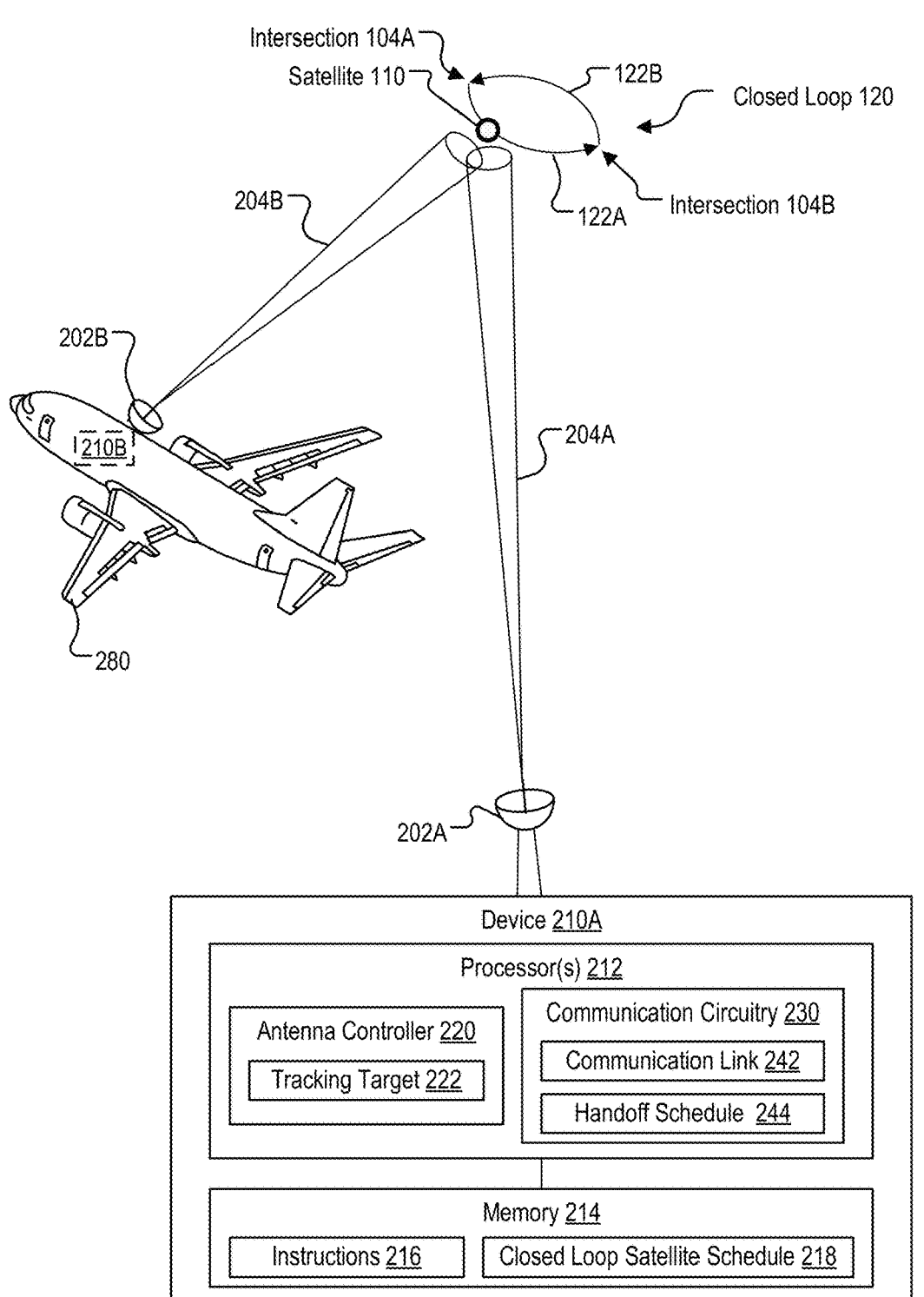
FIG. 2 is a diagram of devices configured to obtain satellite coverage using the system of FIG. 1, in accordance with some examples of the present disclosure.

As used herein, various terminology is used for the purpose of describing particular examples and is not intended to be limiting. For example, the singular forms "a," "an," and "the" are intended to include the plural forms as well, unless the context clearly indicates otherwise. Further, some features described herein can be singular or plural. To illustrate, FIG. 2 depicts a device including one or more processors ("processor(s)" 212 in FIG. 2), which indicates that the device may include a single processor 212 or may include multiple processors 212. For ease of reference herein, such features are generally introduced as "one or more" features, and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, a device that is "configured to" perform an operation includes dedicated circuitry, hardware, or other components that enable the operation to be performed by the device. As an example, programming of a general purpose processor with instructions that, when executed by the processor, cause the processor to perform a particular operation results in a special-purpose processor that is configured to perform that particular operation. A device can be configured to perform multiple operations. A device that is configured to perform an operation does not necessarily exclude the device from being configured to perform other operations.

As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Referring to FIG. 1, a first chart 100 illustrates an example of a set of satellites 110 of a system 108 configured to provide coverage using orbits having transits 102 across the sky (e.g., paths of travel as perceived by an observer on Earth), where two or more of the transits 102 represent paths followed by the satellites 110 and are arranged to intersect to form a closed loop 120. The closed loop 120 enables a continuous communication link to be maintained using a single-beam antenna that tracks satellites along a path 122 around the closed loop 120. A second chart 190 illustrates a conventional system to provide polar coverage in which steering a single-beam antenna between satellites 194 results in a communication link discontinuity.

The first chart 100 corresponds to a sky track plot, from the north pole, of satellites of the system 108. In the first chart 100, the center of the plot corresponds to the zenith, and the circular edge of the plot corresponds to the horizon. The top of the first chart 100 corresponds to 0 degrees longitude, and the bottom of the first chart 100 corresponds to 180 degrees longitude.

In the first chart 100, the set of satellites 110 includes three satellites, illustrated as a first satellite 110A, a second satellite 110B, and a third satellite 110C. The first chart 100 shows the positions of the satellites 110 and the direction of movement of each of the satellites 110 (illustrated by arrows) at a particular moment of time. Movement of the satellites 110 along the transits 102 is described below and in further detail with reference to FIG. 4.

The two or more transits 102 include a transit 102A and a transit 102B that intersect to form an eye-shaped closed loop 120A. In particular, the transit 102A and the transit 102B intersect at a first intersection 104A and at a second intersection 104B. A first path 122A from the second intersection 104B to the first intersection 104A along the transit 102A forms one side of the eye-shaped closed loop 120A, and a second path 122B from the first intersection 104A to the second intersection 104B during the transit 102B forms the other side of the eye-shaped closed loop 120A.

Movement of the satellites 110 along the respective transits 102 causes, at each intersection 104 of the closed loop 120, two or more satellites of the set of satellites 110 to be distanced from each other in a manner that enables coverage of the two or more satellites by a single beam of an antenna that tracks one of the satellites 110. Coverage of two or more satellites by a single beam of an antenna enables handoff of a communication link from one of the satellites 110 to another of the satellites 110 at an intersection 104 of the transits 102 without discontinuity.

To illustrate, when the first satellite 110A is at the first intersection 104A, the first satellite 110A and the second satellite 110B are both within a beam coverage 130A of an antenna that tracks the first satellite 110A. Thus, a communication link with the first satellite 110A can be handed over to the second satellite 110B while both the first satellite 110A and the second satellite 110B are within the beam coverage 130A, and the antenna can update its tracking target to track the second satellite 110B. When the second satellite 110B has followed the second path 122B and reaches the second intersection 104B, the second satellite 110B and the third satellite 110C are both within a beam coverage 130B of the antenna, and the communication link can be handed over to the third satellite 110C while both the second satellite 110B and the third satellite 110C are within the beam coverage 130B. Examples of tracking satellites and performing handoff as the satellites enter and exit the eye-shaped closed loop 120A are described further with reference to FIG. 2.

During operation, the movement of the satellites 110 along the transits 102 enables an antenna to maintain a substantially continuous communication link by tracking each of the satellites 110 from entry into the eye-shaped closed loop 120A at one of the intersections 104 (e.g., the first intersection 104A) to exit from the eye-shaped closed loop 120A at the other intersection 104 (e.g., the second intersection 104B).

A ground station having a single-beam antenna can establish a communication link with the first satellite 110A upon the first satellite 110A entering the eye-shaped closed loop 120A at the second intersection 104B. The communication link with the first satellite 110A is maintained as the antenna tracks the first satellite 110A along the first path 122A. The communication link is handed off to the second satellite 110B at the first intersection 104A, as the first satellite 110A exits the eye-shaped closed loop 120A and the second satellite 110B enters the eye-shaped closed loop 120A.

The communication link with the second satellite 110B is maintained as the antenna tracks the second satellite 110B along the second path 122B. Upon the second satellite 110B and the third satellite 110C entering the second intersection 104B, the communication link is handed off from the second satellite 110B (which is exiting the eye-shaped closed loop 120A) to the third satellite 110C (which is entering the eye-shaped closed loop 120A).

The communication link with the third satellite 110C is maintained as the antenna tracks the third satellite 110C along the first path 122A. While the third satellite 110C travels the first path 122A toward the first intersection 104A, the first satellite 110A also approaches the first intersection 104A along the transit 102B. Upon the third satellite 110C and the first satellite 110A entering the first intersection 104A, the communication link is handed off from the third satellite 110C to the first satellite 110A.

Such handoffs between the satellites 110 at the intersections 104 of the closed loop 120 enable a substantially continuous communication link to be maintained perpetually throughout a multi-year life of the system 108.

A continuous communication link cannot be provided by a single-beam antenna in the conventional system illustrated in the second chart 190, where coverage is provided by a first satellite 194A and a second satellite 194B that follow conventional polar orbits, such as Tundra orbits. An antenna beam tracks the first satellite 194A along a first transit 192A, and when the first satellite 194A is about to leave the field of view of the antenna, the second satellite 194B enters the field of view of the antenna. The antenna then tracks the second satellite 194B along a second transit 192B. For a single-beam antenna tracking the first satellite 194A, handover of a communication link from the first satellite 194A to the second satellite 194B requires an interruption of the communication link while the antenna redirects the antenna beam from the first satellite 194A to the second satellite 194B along a beam steering path 196. To illustrate, a single-beam ground antenna must break communication with the first satellite 194A leaving the field of view, slew its antenna across a wide swath of sky, and begin a search for the second satellite 194B entering the field of view, causing communication to be unavailable for the duration of this transition time. In addition, handover of the communication link is complicated by low elevation angles, wide separation, and short timing opportunity.

By configuring the orbits of the satellites 110 according to the present techniques so that when each satellite exits the closed loop 120 at an intersection 104, another satellite is entering the closed loop 120 at the same intersection 104, the entering satellite and the exiting satellite can both be within a single beam coverage 130. Thus, a single-beam antenna can maintain a continuous communication link by performing handovers between the satellite exiting the closed loop 120 and the satellite entering the closed loop 120 without having to break communications to slew the antenna across the sky. As a result, ground terminals having a single-beam antenna can achieve continuous service by following the closed loop 120 and performing handovers at the intersections 104 where two satellites are in simultaneous view of the antenna beam.

Although FIG. 1 illustrates the satellite system 108 as a three-satellite system using eye orbits having two horseshoe-shaped (or, e.g., two semi-ellipse shaped) transits 102 that intersect to form the eye-shaped closed loop 120A, the satellite system 108 can optionally include more than three satellites. For example, the satellite system 108 can include six, nine, or more satellites that follow the transits 102 and that are operated as distinct groups of three satellites, with each group of three satellites operating substantially as described above. To illustrate, a first group of satellites may carry a first set of communication links, a second group of satellites carries a second set of communication links, etc.

When the satellite system 108 includes multiple such groups of three satellites, multiple satellites—e.g., at least one satellite from each group—are in the eye-shaped closed loop 120A at any given time. In other examples, the satellite system 108 can include more than three satellites in orbits having transits that intersect to form closed loops other than the eye-shaped closed loop 120A, such as described further with reference to FIG. 8 and FIG. 9.

Although various specific examples of eye orbits are described herein, such as with reference to FIGS. 5, 7, 8, and 9, it should be understood that these specific examples are provided for purposes of illustration rather than of limitation, and that other eye orbits can be implemented using different numbers of satellites, different shapes of the respective closed loops 120, different orbital parameters, etc., are within the scope of and envisioned by the present disclosure.

FIG. 2 depicts an example of antennas 202 and devices 210 configured to obtain satellite coverage using the system of FIG. 1.

The antennas 202 include a ground-based antenna 202A and an air-based antenna 202B that are configured to establish and maintain communication links with satellites 110 in eye orbits as the satellites 110 enter and exit a closed loop 120 formed by their intersecting transits, such as described for the eye-shaped closed loop 120A of FIG. 1.

The ground-based antenna 202A is coupled to a device 210A that corresponds to, or is included in, a ground-based communication terminal. The device 210A includes one or more processors 212 and a memory 214 coupled to the one or more processors 212. The one or more processors 212 include an antenna controller 220 and communication circuitry 230.

The memory 214 includes instructions 216 that are executable by the one or more processors 212 to perform operations described with respect to the antenna controller 220 and the communication circuitry 230. The memory 214 also includes a closed loop satellite schedule 218 that includes information to assist the antenna controller 220 with locating and tracking the satellites 110 as they traverse the paths 122A and 122B of the closed loop 120. For example, the closed loop satellite schedule 218 can include location and timing information of individual satellites 110 scheduled to enter and exit the closed loop 120 at the first intersection 104A and the second intersection 104B.

The antenna controller 220 is configured to direct a beam 204A of the ground-based antenna 202A to locate and track the individual satellites 110 as they enter and exit the closed loop 120, updating a tracking target 222 to indicate which satellite is currently being tracked. In an example, the antenna controller 220 generates control signals to control operation of the ground-based antenna 202A, such as control signals to direct the beam 204A. The ground-based antenna 202A is a dish antenna or other antenna that includes mechanical actuators (e.g., azimuth and elevation motors) and is responsive to the antenna controller 220 to control the orientation (e.g., rotation and inclination) of the beam 204A in some examples. In other examples, the ground-based antenna 202A includes an array and a beam steerer that is responsive to the antenna controller 220 to direct the beam 204A.

The communication circuitry 230 is configured to maintain a communication link 242 via the beam 204A. In an example, the communication circuitry 230 is responsive to a handoff schedule 244 to control handing off the communication link 242 from satellites exiting the closed loop 120 to satellites entering the closed loop 120, in conjunction with switching the tracking target 222 of the beam 204A, to enable continuous satellite coverage.

During operation, the antenna controller 220 directs the beam 204A to track a first satellite (e.g., the first satellite 110A) along the second path 122B upon the first satellite entering the closed loop 120, such as by designating the first satellite as a tracking target 222 of the beam 204A. In addition, the communication circuitry 230 establishes and maintains the communication link 242 with the first satellite while the first satellite is being tracked.

Upon the first satellite reaching the first intersection 104A to exit the closed loop 120, a second satellite (e.g., the second satellite 110B) is entering the closed loop 120 at the first intersection 104A, and the antenna controller 220 switches the tracking target 222 of the beam 204A from the first satellite to the second satellite when the first satellite and the second satellite are at the first intersection 104A. The antenna controller 220 switches the tracking target 222 while the beam 204A covers both of the first satellite and the second satellite at the first intersection 104A, and the communication circuitry 230 causes the communication link 242 with the first satellite to be handed off to the second satellite. Coverage of both satellites by the single beam 204A enables handoff of the communication link 242 from the first satellite to the second satellite without discontinuity.

Upon switching the tracking target 222 to the second satellite and handoff of the communication link 242 from the first satellite to the second satellite, the antenna controller 220 directs the beam 204A to track the second satellite along the first path 122A. Upon the second satellite reaching the second intersection 104B to exit the closed loop 120, a third satellite (e.g., the third satellite 110C) is entering the closed loop 120 at the second intersection 104B, and the antenna controller 220 switches the tracking target 222 of the beam 204A from the second satellite to the third satellite when the second satellite and the third satellite are at the second intersection 104B. Also upon the second satellite and the third satellite entering the second intersection 104B, the communication circuitry 230 causes the communication link 242 to be handed off from the second satellite to the third satellite.

The antenna controller 220 tracks the third satellite along the second path 122B and switches the tracking target 222 from the third satellite back to the first satellite when the third satellite and the first satellite are at the first intersection 104A. Upon the third satellite and the first satellite entering the first intersection 104A, the communication circuitry 230 causes the communication link 242 to be handed off from the third satellite to the first satellite.

Thus, the antenna controller 220 causes the beam 204A to trace a path (e.g., the path 122) that continually follows the closed loop 120 as a result of switching the tracking target 222, at each intersection 104 of the transits 102 that form the closed loop 120, from a satellite exiting the closed loop 120 at that intersection 104 to a satellite entering the closed loop 120 at that intersection 104. In addition, the communication circuitry 230 also directs handoffs of the communication link 242 from the satellite exiting the closed loop at that intersection 104 to the satellite entering the closed loop at that intersection 104. As a result, the antenna 202A maintains a substantially continuous communication link 242 by tracking each of the satellites from entry into the closed loop 120 at a first intersection 104 to exit from the closed loop at a second intersection 104.

The air-based antenna 202B is coupled to a device 210B that is integrated in an aircraft 280 and that corresponds to, or is included in, an air-based communication terminal. The air-based antenna 202B and the device 210B operate in a similar manner as described for the ground-based antenna 202A and the device 210A, including directing a beam 204B that continually follows the closed loop 120 as a result of switching a tracking target from a satellite that exits the closed loop 120 at an intersection 104 to another satellite that enters the closed loop at the intersection 104. Handover of a communication link carried by the beam 204B is performed concurrently with switching tracking targets, enabling a substantially continuous communications link to be maintained.

FIG. 3 is a diagram depicting an example of components, including a satellite communication control system 340 and a satellite orbital controller 350, that are configured to provide satellite coverage using the system of FIG. 1. The satellite communication control system 340 and the satellite orbital controller 350 can be included in the satellite 110, included in an air-based or ground-based system illustrated as satellite control system 370, or both.

As illustrated, the satellite 110 includes an antenna 308 and internal components 310. The components 310 include one or more processors 312, a memory 314, and a satellite propulsion system 360. The one or more processors 312 include a satellite communication control system 340A and a satellite orbital controller 350A. The memory 314 includes instructions 316 that are executable by the one or more processors 312 to perform operations and functions associated with the satellite communication control system 340A and the satellite orbital controller 350A. The memory 314 also includes closed loop orbit data 318 such as location and time data corresponding to when the satellite 110 is scheduled to enter and exit the closed loop 120, as well as other data pertinent to the operation of the satellite 110 as it travels along its eye orbit.

The satellite orbital controller 350A is configured to generate control signals 352 to cause the satellite 110 to follow an eye orbit. For example, the satellite 110 may obtain attitude and location data of the satellite 110 based on signals received via the antenna 308 (e.g., from signal sources having known locations) and/or data from one or more sensor devices, such as one or more gyroscopes, motion reference units, cameras, horizon sensors, orbital gyrocompasses, sun sensors, earth sensors, star trackers, magnetometers, etc. The satellite orbital controller 350A may compare the attitude and location data to the closed loop orbit data 318 and generate the control signals 352 in response to determining that a correction is needed.

The satellite propulsion system 360 includes one or more components that are integrated in the satellite 110 and responsive to the control signals 352. For example, the satellite propulsion system 360 can include one or more thrusters, momentum wheels, control moment gyroscopes, etc., that operate in response to the control signals 352 to correct the attitude and/or motion of the satellite 110.

The satellite communication control system 340A is configured to control communications according to a handoff schedule 344 associated with the satellite 110 entering or exiting the closed loop 120. For example, the handoff schedule 344 can include information indicating scheduled hand-overs of a communications link 342 from another satellite to the satellite 110, from the satellite 110 to another satellite, or both. The handoff schedule 344 can optionally be included in the closed loop orbit data 318. The handoff schedule 344 can correspond to, or include a portion of, the handoff schedule 244 of FIG. 2.

The satellite communication control system 340A can therefore control the communication link handoffs that occur at the intersections 104, as described in FIG. 1, and that involve the satellite 110. In an illustrative example in which the satellite 110 corresponds to the first satellite 110A of FIG. 1, the satellite communication control system 340A is configured to, upon the satellite 110 exiting the closed loop 120 at the first intersection 104A of FIG. 1, perform handoff of the communication link 342 from the satellite 110 (e.g., the first satellite 110A) to the second satellite 110B that enters the closed loop 120 at the first intersection 104A. In an example, prior to performing the handoff to the second satellite 110B, the satellite communication control system 340A establishes the communication link 342 upon the satellite 110 entering the closed loop 120 at the second intersection 104B and via a handoff of the communication link 342 from the third satellite 110C that exits the closed loop 120 at the second intersection 104B.

Although in the satellite orbital controller 350A and the satellite communication control system 340A are integrated in the satellite 110, some or all of the functionality associated with the satellite orbital controller 350A, with the satellite communication control system 340A, or both, can be implemented in an air-based or ground-based system, such as the satellite control system 370.

The satellite control system 370 includes one or more processors 372 that include a satellite communication control system 340B and a satellite orbital controller 350B. A memory 374 is coupled to the one or more processors 372 and includes instructions 376 that are executable by the one or more processors 312 to perform operations and functions associated with the satellite communication control system 340B and the satellite orbital controller 350B. The memory 374 also includes closed loop orbit data 388 that corresponds to the closed loop orbit data 318 and that optionally includes additional orbit data associated with one or more of the other satellites 110 of the system 108.

The satellite orbital controller 350B is configured to generate the control signals 352, which are transmitted to the satellite 110 via an antenna 378 to cause the satellite 110 to make one or more adjustments associated with its eye orbit (e.g., via controlling operation of the satellite propulsion system 360 as described above). For example, the satellite control system 370 can obtain attitude data, location data, or both, of the satellite 110 via transmissions from the satellite 110 that are received at the antenna 378, via one or more other sensors or tracking mechanisms implemented at or accessible to the satellite control system 370, or a combination thereof. The satellite orbital controller 350B may compare the attitude and location data to the closed loop orbit data 388 and generate the control signals 352 in response to determining that a correction is needed.

The satellite communication control system 340B is configured to control communications of the satellite 110 corresponding to scheduled hand-overs of the communications link 342 from another satellite to the satellite 110, from the satellite 110 to another satellite, or both, in accordance with the handoff schedule 344. For example, the satellite communication control system 340B can generate one or more control signals that are transmitted to the satellite 110 via the antenna 378 and that cause the satellite 110 to participate in the scheduled hand-overs of the communications link 342.

Although the satellite 110 is illustrated as including the satellite communication control system 340A, optionally the satellite 110 does not include the satellite communication control system 340A and instead is responsive to external signaling regarding hand-overs of the communication link 342, such as from the satellite communication control system 340B of the satellite control system 370. Similarly, although the satellite 110 is illustrated as including the satellite orbital controller 350A, optionally the satellite 110 does not include the satellite orbital controller 350A and instead is responsive to external signaling regarding orbital corrections, such as the control signals 352 from the satellite orbital controller 350B of the satellite control system 370.

Although the satellite control system 370 is illustrated as including the satellite communication control system 340B, optionally the satellite control system 370 does not include the satellite communication control system 340B and instead operations regarding hand-overs of the communication link 342 are controlled by the satellite communication control system 340A onboard the satellite 110. Similarly, although the satellite control system 370 is illustrated as including the satellite orbital controller 350B, optionally the satellite control system 370 does not include the satellite orbital controller 350B and instead orbital corrections are determined by the satellite orbital controller 350A onboard the satellite 110.

Figure 4:
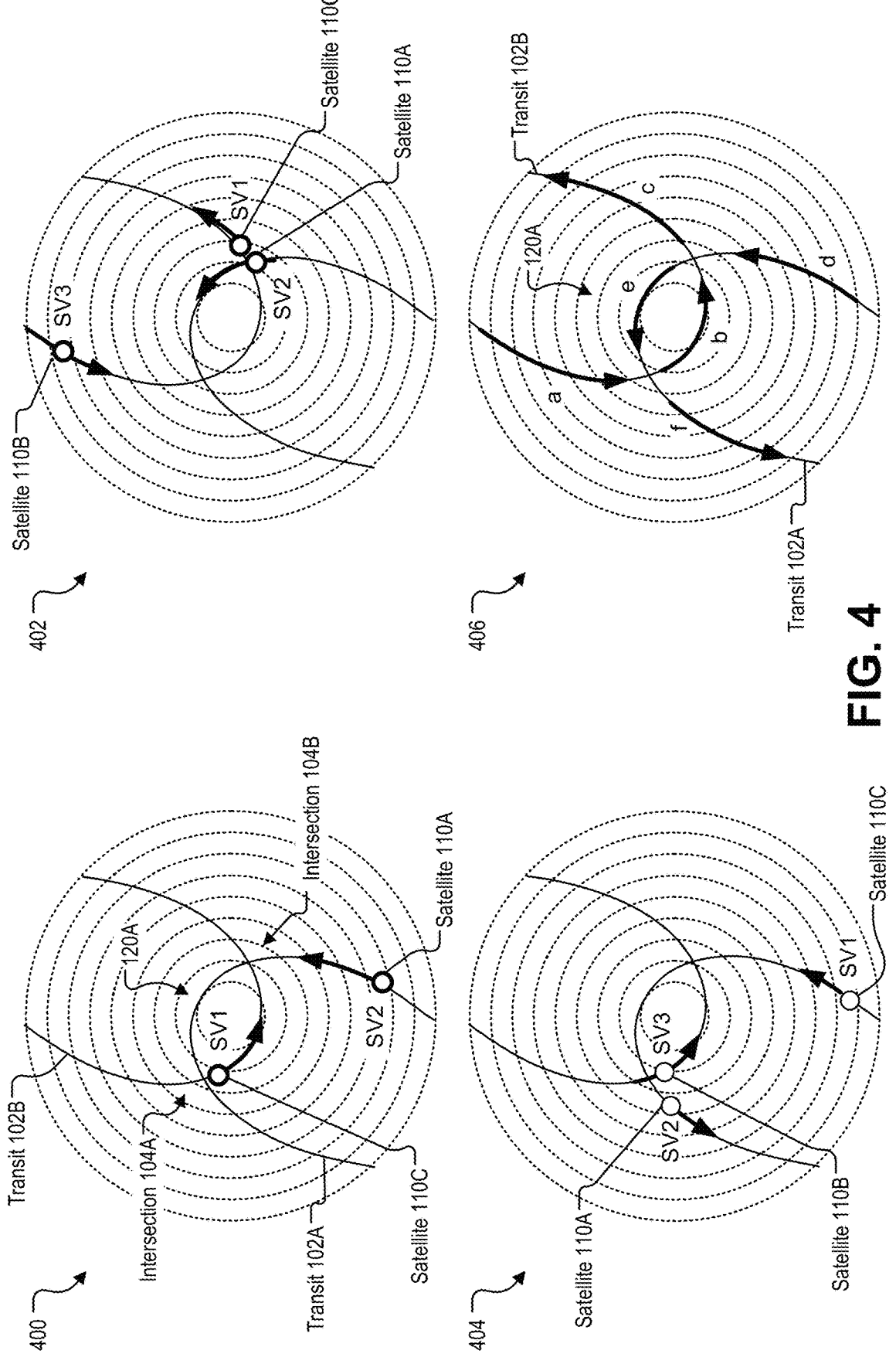
FIG. 4 is a diagram of operation of the system of FIG. 1, in accordance with some examples of the present disclosure.

FIG. 4 depicts an example of operation of the system of FIG. 1, illustrated in a first chart 400, a second chart 402, a third chart 404, and a fourth chart 406.

The first chart 400 illustrates the transit 102A and the transit 102B that intersect at the intersections 104A, 104B to form the eye-shaped closed loop 120A of FIG. 1. The third satellite 110C is labeled "SV1" and is in communication with one or more ground stations (e.g., the device 210A of FIG. 2) as it traverses its orbit between the first intersection 104A and the second intersection 104B. Meanwhile, the first satellite 110A labelled "SV2" is approaching the second intersection 104B.

The second chart 402 illustrates satellite positions at a time following the first chart 400. The one or more ground stations have handed over their communication links from the third satellite 110C (SV1) to the first satellite 110A (SV2) near the second intersection 104B and communicate with the first satellite 110A (SV2) as it traverses its way towards the first intersection 104A. Meanwhile, the second satellite 110B labelled "SV3" is approaching the first intersection 104A.

The third chart 404 illustrates satellite positions at a time following the second chart 402 and corresponds to the first chart 100 of FIG. 1. The one or more ground stations have handed over their communication links from the first satellite 110A (SV2) to the second satellite 110B (SV3) near the first intersection 104A and communicate with the second satellite 110B (SV3) as it traverses its way towards the second intersection 104B. Meanwhile, the third satellite 110C (SV1) is approaching the second intersection 104B.

Each satellite 110 follows the same route along the transits 102. Using the first satellite 110A (SV2) as an example, the first satellite 110A (SV2) appears on the horizon at the bottom of the first chart 400 and follows the transit 102A to the second intersection 104B where it enters the eye-shaped closed loop 120A (in the second chart 402), follows the first path 122A along the transit 102A to the first intersection 104A where it exits the eye-shaped closed loop 120A (in the third chart 404), and continues following the transit 102A until dropping below the horizon. After dropping below the horizon, the first satellite 110A (SV2) continues its orbit and re-appears on the horizon at the top of the charts 400-406. The first satellite 110A (SV2) follows the transit 102B to the first intersection 104A where it again enters the eye-shaped closed loop 120A, follows the second path 122B along the transit 102B to the second intersection 104B where it exits the eye-shaped closed loop 120A, and continues following the transit 102B until again dropping below the horizon. The first satellite 110A (SV2) then re-appears on the horizon at the bottom of the first chart 400 and again follows the transit 102A. Thus, each of the satellites 110 alternates between following the transit 102A and the transit 102B in a repeating cycle.

The fourth chart 406 illustrates the above-described motion along the transits 102A and 102B. The transit 102B includes sections labeled "a" (approaching the eye-shaped closed loop 120A), "b" (in the eye-shaped closed loop 120A), and "c" (leaving the eye-shaped closed loop 120A). The transit 102A includes sections labeled "d" (approaching the eye-shaped closed loop 120A), "e" (in the eye-shaped closed loop 120A), and "f" (leaving the eye-shaped closed loop 120A).

Each satellite repeatedly traverses the circuit a-b-c-d-e-f, where b and e are the active sections of the orbit. Even though b and e are shorter path lengths, the satellites travel slowest over these parts of the orbit. As described above, the closed loop 120A (the 'eye' of the orbit) always contains an active satellite due to one satellite entering the closed loop 120A as another satellite leaves the closed loop 120A, which is a result of the orbit parameters and the spacing of the satellites in the orbit, such as described further with reference to FIG. 5 and FIGS. 7-9.

Ground stations can track satellites within the eye pattern to maintain continuous service. During a hand-over of a communication link from a hand-off satellite exiting the closed loop 120 and a hand-on satellite entering the closed loop 120, the hand-off satellite may cross just ahead of the hand-on satellite. A ground antenna tracking the hand-off satellite may stop its motion at the hand-over point (e.g., the intersection 104A or 104B) and establish a new track of the hand-on satellite in alternating arcs of the eye.

Figure 5:
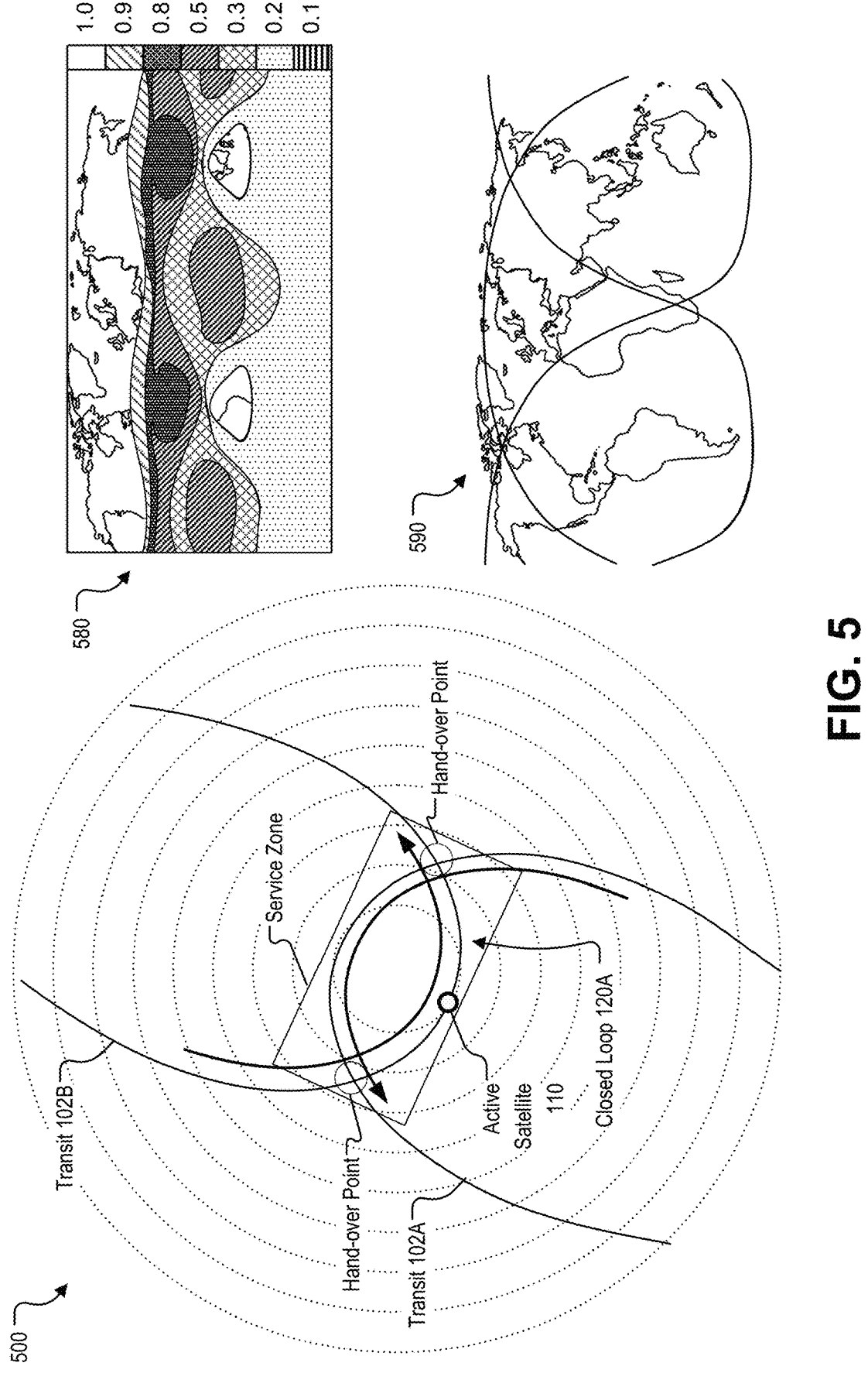
FIG. 5 is a diagram of characteristics of orbits that can be used in the system of FIG. 1, in accordance with some examples of the present disclosure.

FIG. 5 is a diagram of an example of characteristics of orbits that can be used in the system of FIG. 1, illustrated in graphical form in a chart 500, a service map 580 that illustrates a proportion of the time that satellite coverage is provided at 15 degree elevation, and a ground track diagram 590.

The chart 500 corresponds to a sky track plot at the North Pole and illustrates an eye orbit having parameters that produce a sky track that appears as two horse-shoe shaped lobes (the transits 102A and 102B) which overlap one another in a service zone of the eye orbit. The 'eye' is within the service zone and corresponds to a closed loop 120 formed of the two overlapping arcs.

Table 1 depicts an example of a True Equator, Mean Equinox (TEME) ephemeris including parameters for the orbits having the transits depicted in the chart 500. The parameters include Mean Motion (e.g., revolutions per day), Eccentricity (e.g., deviation from circular), Inclination (e.g., tilt of orbital plane from Earth's equatorial plane, in degrees), Argument of Perigee (e.g., angle from ascending node to perigee, in degrees), Right Ascension of the Ascending Node (RAAN) (e.g., angle of ascending node measured eastward from the First Point of Aries, in degrees), and Mean Anomaly (e.g., angular distance from pericenter that the satellite would have if it moved in a circular orbit, with constant speed, in the same orbital period as in its elliptical orbit, in degrees).

As shown in Table 1, for the 3-satellite system illustrated in the chart 500, the satellites SV1, SV2, and SV3 (e.g., satellites 110C, 110A, and 110B, respectively), have the same Mean Motion, Eccentricity, Inclination, and Argument Perigee, and have different values of RAAN and Mean Anomaly.

TABLE 1

| TEME Ephemeris | SV1 | SV2 | SV3 |
|---|---|---|---|
| Mean Motion | | 2.0041 | |
| Eccentricity | | 0.5874 | |
| Inclination | | 101.5 | |
| Argument Perigee | | 270 | |
| RAAN | 0 | 240 | 120 |
| Mean Anomaly | 0 | 240 | 120 |

Table 2 depicts an example of orbital characteristics for the orbits having the transits depicted in the chart 500.

TABLE 2

| Orbital Characteristics | SV1 | SV2 | SV3 |
|---|---|---|---|
| Apogee (kilometers) | | 42,163 | |
| Perigee (kilometers) | | 10,959 | |
| Period | | half-sidereal | |

Figure 6:
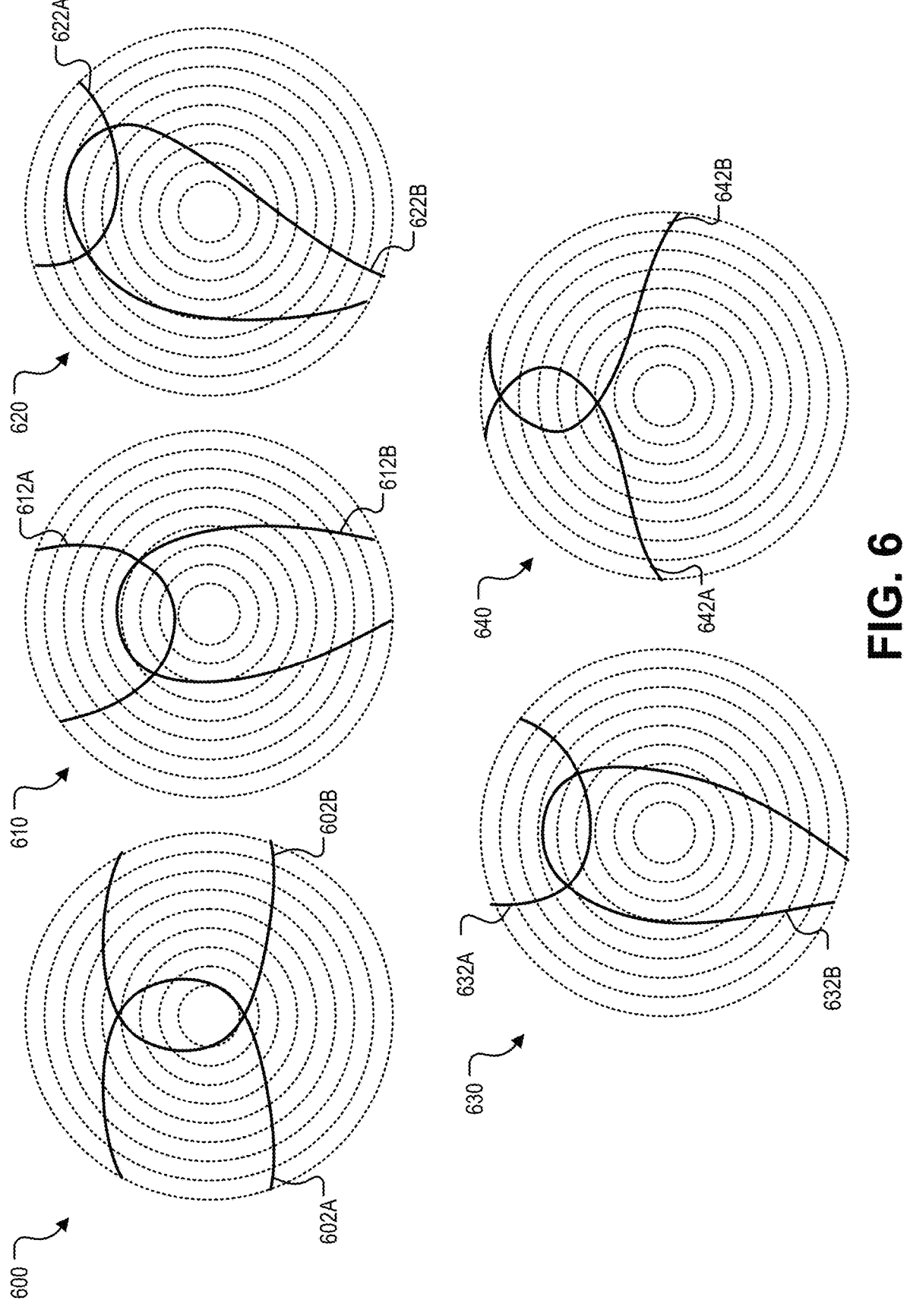
FIG. 6 is a diagram illustrating examples of transits associated with the orbits of FIG. 5.

FIG. 6 is a diagram illustrating examples of transits associated with the orbits of FIG. 5 at various northern cities, including a chart 600 depicting a sky track at Thule Air Force Base (AFB) in Greenland, a chart 610 depicting a sky track at Fairbanks, Alaska, a chart 620 depicting a sky track at the Strait of Gibraltar, a chart 630 depicting a sky track at Ramstein AFB in Germany, and a chart 640 depicting a sky track at the Space Force Satellite Control Network (SFSCN) station in New Hampshire.

Service quality associated with the orbits is highest when the eye (e.g., the closed loop 120) is in the center of the chart. Service quality lowers as the eye approaches the edge of the chart (the horizon) and is interrupted when the eye crosses the horizon. As illustrated by the charts 600 (Thule AFB) and 610 (Fairbanks) service is excellent at latitudes of 65N and above. Service to most Europe latitudes is very good, as shown by the charts 620 (Strait of Gibraltar) and 620 (Ramstein AFB).

Handover elevations degrade at latitudes below the US-Canada border, such as illustrated in the chart 640 (SFSCN), but service to individual satellites is still good even in places like Los Angeles. Thus, operations such as telemetry, tracking, and command (TT&C), calibration, etc. can be conducted from the continental United States.

Figure 7:
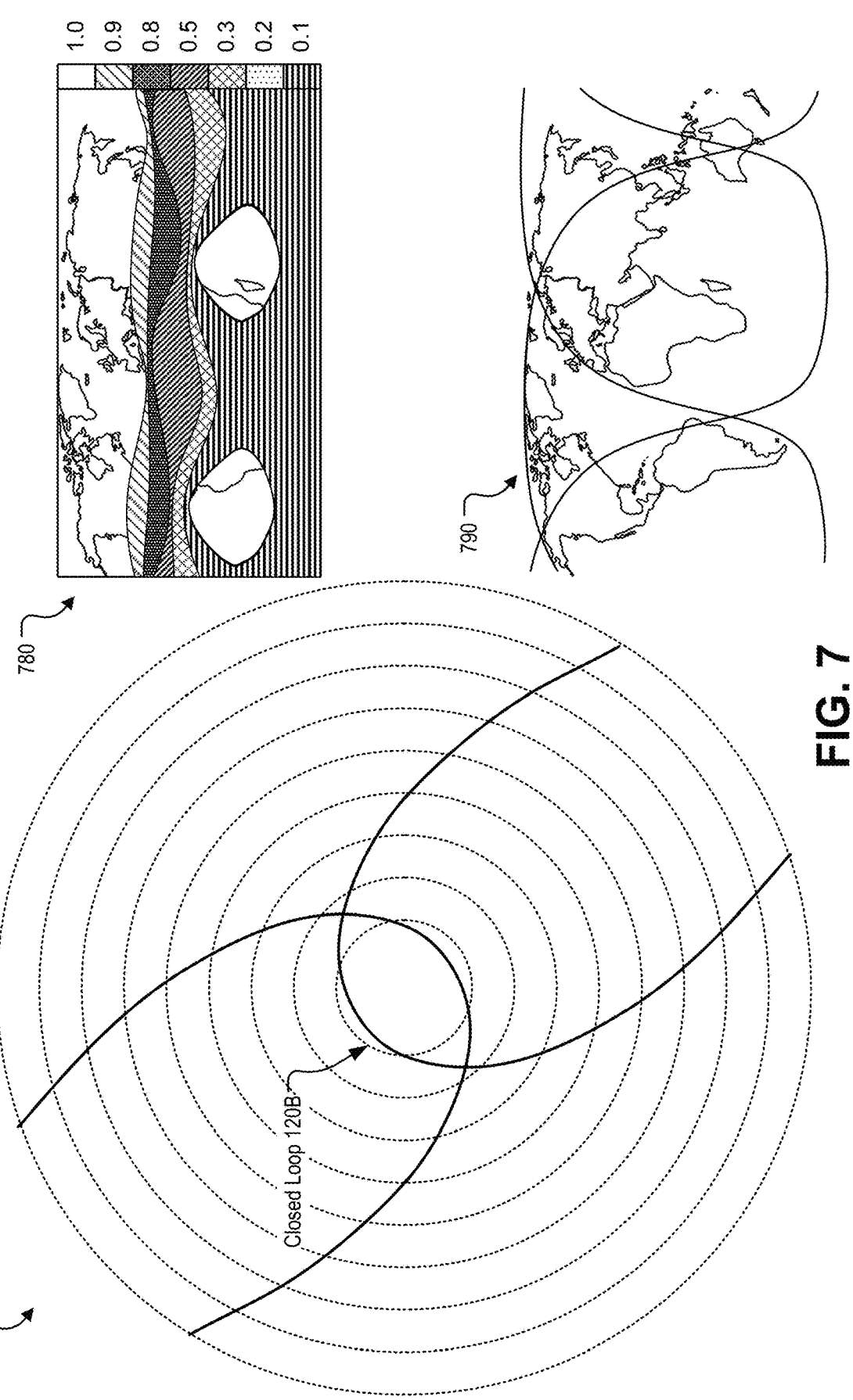
FIG. 7 is a diagram of characteristics of orbits that can be used in the system of FIG. 1, in accordance with some examples of the present disclosure.

FIG. 7 is a diagram of an example of characteristics of orbits that can be used in the system of FIG. 1, illustrated in graphical form in a chart 700, a service map 780 that illustrates a proportion of the time that satellite coverage is provided at 15 degree elevation, and a ground track diagram 790.

The chart 700 corresponds to a sky track plot at the North Pole and illustrates horse-shoe shaped lobes that are narrower and have a different orientation as compared to FIG. 5, and that intersect to form an eye-shaped closed loop 120B that is distinct from the eye-shaped closed loop 120A of FIG. 5.

Table 3 depicts an example of TEME ephemeris including parameters for the orbits having the transits depicted in the chart 700, and Table 4 depicts an example of orbital characteristics for the orbits having the transits depicted in the chart 700.

TABLE 3

| TEME Ephemeris | SV1 | SV2 | SV3 |
|---|---|---|---|
| Mean Motion | | 2.0055 | |
| Eccentricity | | 0.7 | |
| Inclination | | 98 | |
| Argument Perigee | | 270 | |
| RAAN | 0 | 240 | 120 |
| Mean Anomaly | 0 | 240 | 120 |

TABLE 4

| Orbital Characteristics | SV1 | SV2 | SV3 |
|---|---|---|---|
| Apogee (kilometers) | | 45,154 | |
| Perigee (kilometers) | | 7,968 | |
| Period | | half-sidereal | |

Figure 8:
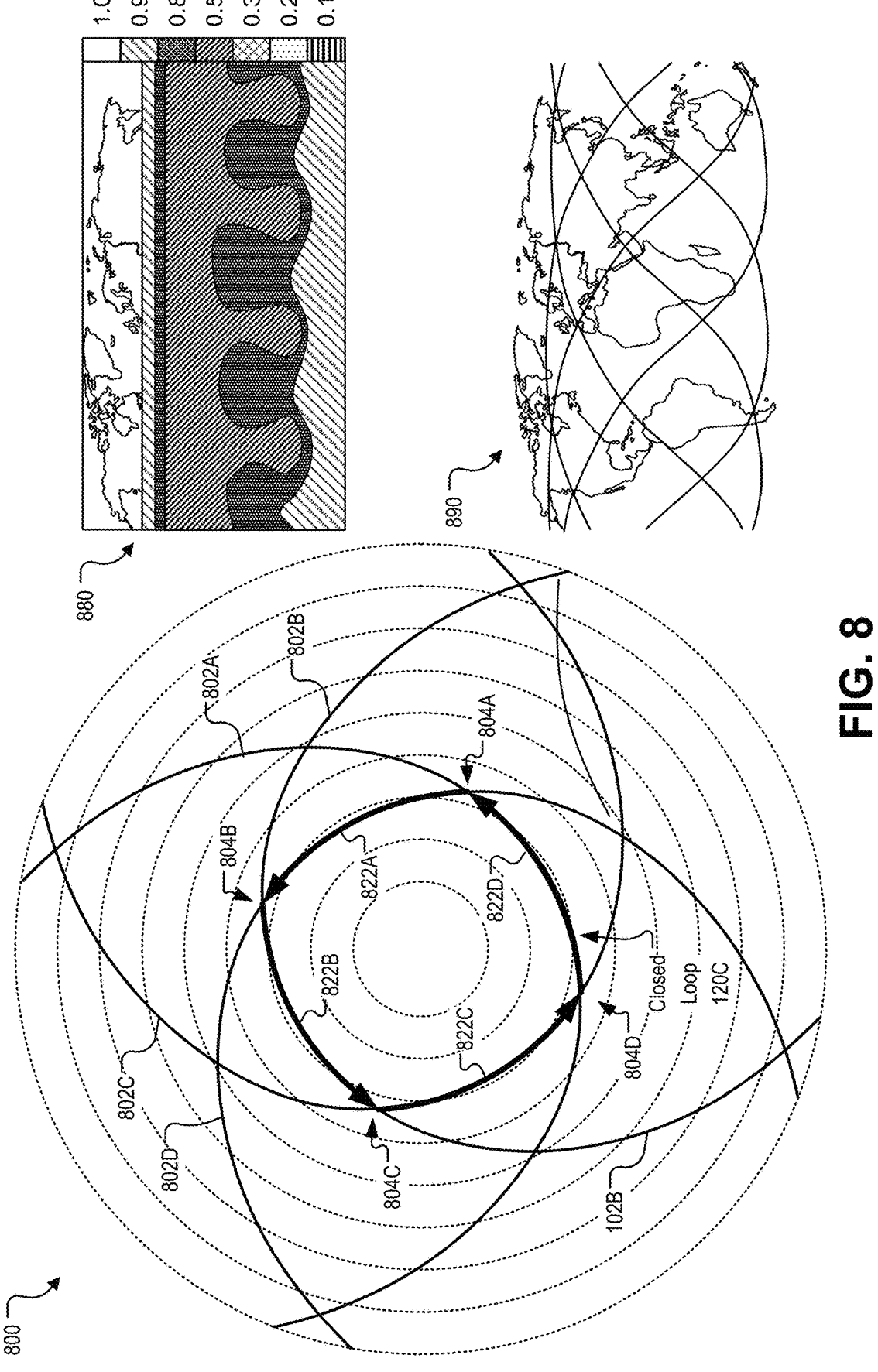
FIG. 8 is a diagram of characteristics of orbits that can be used in the system of FIG. 1, in accordance with some examples of the present disclosure.

FIG. 8 is a diagram of an example of orbits of a set of six satellites having transits across the sky arranged to intersect to form a closed loop, illustrated in graphical form in a chart 800, a service map 880 that illustrates a proportion of the time that satellite coverage is provided at 15 degree elevation, and a ground track diagram 890.

The chart 800 corresponds to a sky track plot at the North Pole and illustrates a 4-point closed loop 120C eye orbit with six satellites that trace a first pair of lobes 802A and 802B and a second pair of lobes 802C and 802D. The lobes intersect at four hand-over points 804A, 804B, 804C, and 804D, and the closed loop 120C is formed from paths 822A, 822B, 822C, and 822D corresponding to travel paths of satellites between the hand-over points 804A, 804B, 804C, and 804D.

Table 5 depicts an example of TEME ephemeris including parameters for the orbits having the transits depicted in the chart 700, and Table 6 depicts an example of orbital characteristics for the orbits having the transits depicted in the chart 800.

TABLE 5

| TEME Ephemeris | SV1 | SV2 | SV3 | SV4 | SV5 | SV6 |
|---|---|---|---|---|---|---|
| Mean Motion | | | 2.004 | | | |
| Eccentricity | | | 0.38 | | | |
| Inclination | | | 116.5 | | | |
| Argument Perigee | | | 270 | | | |
| RAAN | 0 | 120 | 240 | 180 | 300 | 60 |
| Mean Anomaly | 0 | 120 | 240 | 180 | 300 | 60 |

TABLE 6

| Orbital Characteristics | SV1 | SV2 | SV3 | SV4 | SV5 | SV6 |
|---|---|---|---|---|---|---|
| Apogee (kilometers) | | | 36,673 | | | |
| Perigee (kilometers) | | | 16,476 | | | |
| Period | | | half-sidereal | | | |

Figure 9:
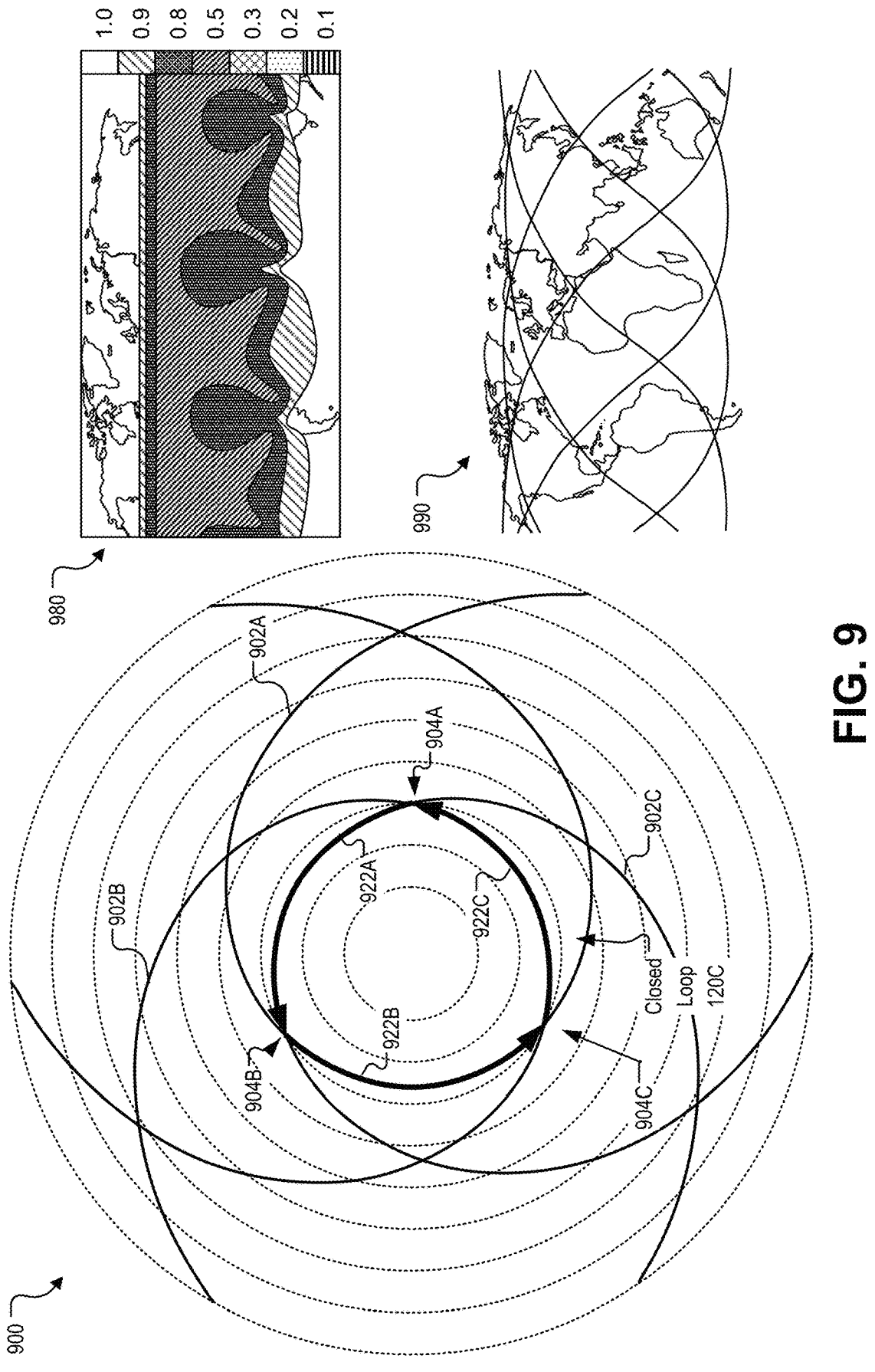
FIG. 9 is a diagram of characteristics of orbits that can be used in the system of FIG. 1, in accordance with some examples of the present disclosure.

FIG. 9 is a diagram of an example of orbits of a set of six satellites having transits across the sky arranged to intersect to form a closed loop, illustrated in graphical form in a chart 900, a service map 980 that illustrates a proportion of the time that satellite coverage is provided at 15 degree elevation, and a ground track diagram 990.

The chart 900 corresponds to a sky track plot at the North Pole and illustrates a 3-point closed loop 120D eye orbit with six satellites that trace a first loop 902A, a second loop 902B, and a third loop 902C. The loops intersect at three hand-over points 904A, 904B, and 904C, and the closed loop 120D is formed from paths 922A, 922B, and 922C corresponding to travel paths of satellites between the hand-over points 904A, 904B, and 904C.

Table 7 depicts an example of TEME ephemeris including parameters for the orbits having the transits depicted in the chart 900, and Table 8 depicts an example of orbital characteristics for the orbits having the transits depicted in the chart 900.

TABLE 7

| TEME Ephemeris | SV1 | SV2 | SV3 | SV4 | SV5 | SV6 |
|---|---|---|---|---|---|---|
| Mean Motion | | | 1.002 | | | |
| Eccentricity | | | 0.38 | | | |
| Inclination | | | 116.5 | | | |
| Argument Perigee | | | 270 | | | |
| RAAN | 0 | 120 | 240 | 180 | 300 | 60 |
| Mean Anomaly | 0 | 120 | 240 | 180 | 300 | 60 |

TABLE 8

| Orbital Characteristics | SV1 | SV2 | SV3 | SV4 | SV5 | SV6 |
|---|---|---|---|---|---|---|
| Apogee (kilometers) | | | 58,215 | | | |
| Perigee (kilometers) | | | 26,154 | | | |
| Period | | | geosynchronous | | | |

FIG. 10 is a flowchart illustrating a method 1000 of providing polar coverage. In a particular implementation, the method 1000 is performed by the system 108, the satellites 110, the components 310, the satellite control system 370, or a combination thereof.

The method 1000 includes, at block 1002, causing a second satellite of a set of satellites in orbits having transits across the sky to receive a handoff of a communication link from a first satellite of the set of satellites, where the transits are arranged to intersect to form a closed loop and where the communication link is handed off upon the first satellite exiting the closed loop at a first intersection and the second satellite entering the closed loop at the first intersection. For example, the satellite communication control system 340 causes the second satellite 110B illustrated in FIG. 1 to receive a handoff of a communication link 342 from the first satellite 110A at the first intersection 104A as the second satellite 110B enters the closed loop 120 and the first satellite 110A exits the closed loop 120. At the first intersection, the first satellite is distanced from the second satellite in a manner that may enable coverage of the first satellite and the second satellite by a single beam of an antenna that carries the communication link. For example, at the first intersection 104A, the first satellite 110A and the second satellite 110B are within the beam coverage 130A, which can correspond to a coverage area of a single beam 204 of an antenna 202 of FIG. 2.

The method 1000 also includes, at block 1004, causing the second satellite to hand off the communication link to a third satellite of the set of satellites upon the second satellite exiting the closed loop at a second intersection and the third satellite entering the closed loop at the second intersection. For example, the satellite communication control system 340 causes the second satellite 110B to hand off the communication link 342 to the third satellite 110C when the second satellite 110B exits the closed loop 120 and the third satellite 110C enters the closed loop 120 at the second intersection 104B.

The communication link can be maintained in a substantially continuous manner by the first satellite, the second satellite, and the third satellite according to a handoff schedule, such as the handoff schedule 244 or the handoff schedule 344, associated with each of the first satellite, the second satellite, and the third satellite entering or exiting the closed loop.

The method 1000 thus enables a communication link to be continuously maintained with a ground terminal via a series of handoffs between satellites entering and leaving the closed loop. As a result, the method 1000 enables continuous satellite coverage to be provided, in a polar region, to a ground terminal having a single-beam antenna, which provides the technical advantage of improving satellite communication for such ground terminals as compared to conventional systems in which communications are interrupted when the single-beam antenna slews across the sky to locate a next satellite.

Figure 11:
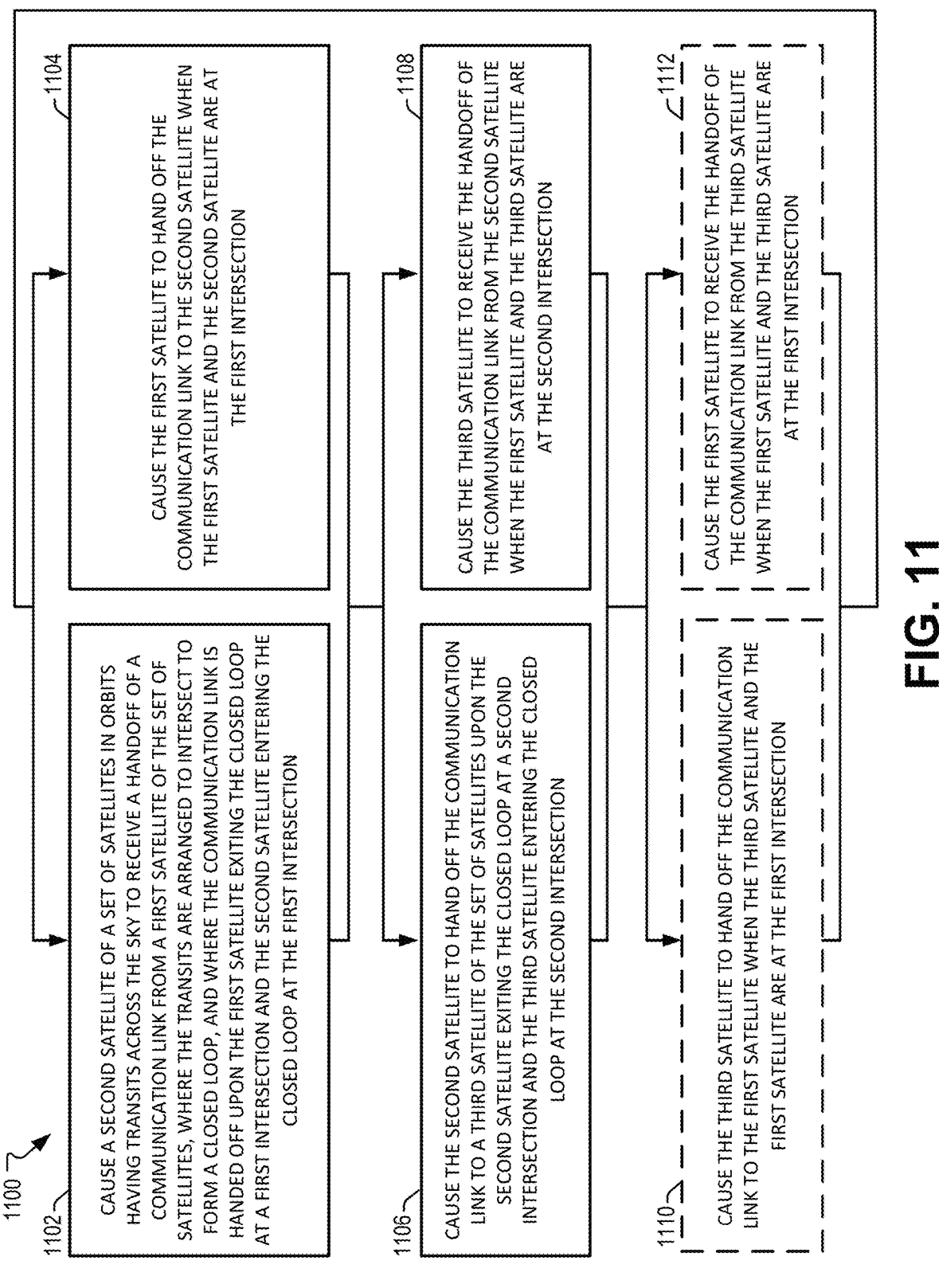
FIG. 11 is a flowchart illustrating an example of a method of providing polar coverage using the system of FIG. 1.

FIG. 11 is a flowchart illustrating another method 1100 of providing polar coverage. In a particular implementation, the method 1100 is performed by the system 108, the satellites 110, the components 310, the satellite control system 370, or a combination thereof.

The method 1100 includes, at block 1102, causing a second satellite of a set of satellites in orbits having transits across the sky to receive a handoff of a communication link from a first satellite of the set of satellites, where the transits are arranged to intersect to form a closed loop and where the communication link is handed off upon the first satellite exiting the closed loop at a first intersection and the second satellite entering the closed loop at the first intersection. For example, the satellite communication control system 340 causes the second satellite 110B illustrated in FIG. 1 to receive a handoff of a communication link 342 from the first satellite 110A at the first intersection 104A as the second satellite 110B enters the closed loop 120 and the first satellite 110A exits the closed loop 120. At the first intersection, the first satellite is distanced from the second satellite in a manner that may enable coverage of the first satellite and the second satellite by a single beam of an antenna that carries the communication link. For example, at the first intersection 104A, the first satellite 110A and the second satellite 110B are within the beam coverage 130A, which can correspond to a coverage area of a single beam 204 of an antenna 202 of FIG. 2.

The method 1100 includes, at block 1104, causing the first satellite to hand off the communication link to the second satellite when the first satellite and the second satellite are at the first intersection. For example, the satellite communication control system 340 causes the first satellite 110A to hand off the communication link 342 to the second satellite 110B at the first intersection 104A.

The method 1100 includes, at block 1106, causing the second satellite to hand off the communication link to a third satellite of the set of satellites upon the second satellite exiting the closed loop at a second intersection and the third satellite entering the closed loop at the second intersection. For example, the satellite communication control system 340 causes the second satellite 110B to hand off the communication link 342 to the third satellite 110C when the second satellite 110B exits the closed loop 120 and the third satellite 110C enters the closed loop 120 at the second intersection 104B.

The method 1100 also includes, at block 1108, causing the third satellite to receive the handoff of the communication link from the second satellite when the first satellite and the third satellite are at the second intersection. For example, the satellite communication control system 340 causes the third satellite 110C to receive the handoff of the communication link 342 from the second satellite 110B at the second intersection 104B.

The method 1100 optionally includes, at block 1110, after the third satellite receives the communication link from the second satellite at the second intersection, causing the third satellite to hand off the communication link to the first satellite when the third satellite and the first satellite are at the first intersection. For example, the satellite communication control system 340 causes the third satellite 110C to hand off the communication link 342 to the first satellite 110A at the first intersection 104A.

The method 1100 optionally includes, at block 1112, after the third satellite receives the communication link from the second satellite at the second intersection, causing the first satellite to receive the handoff of the communication link from the third satellite when the first satellite and the third satellite are at the first intersection. For example, the satellite communication control system 340 causes the first satellite 110A to receive the communication link 342 from the third satellite 110C at the first intersection 104A.

According to an aspect, the communication link is maintained in a substantially continuous manner by the first satellite, the second satellite, and the third satellite according to a handoff schedule, such as the handoff schedule 244 or the handoff schedule 344, associated with each of the first satellite, the second satellite, and the third satellite entering or exiting the closed loop.

FIG. 12 is a flowchart illustrating a method 1200 of obtaining polar coverage. In a particular implementation, the method 1200 is performed by the antenna controller 220 of a device 210 of FIG. 2.

The method 1200 includes, at block 1202, directing, at an antenna controller, a beam to track a first satellite that follows an orbit having a transit arranged to intersect a transit of one or more other satellites to form a closed loop. For example, the antenna controller 220 causes an antenna 202 to direct a beam 204 to track the first satellite 110A along the transits 102 that intersect to form the closed loop 120 of FIG. 1.

The method 1200 includes, at block 1204, switching, at the antenna controller, a tracking target of the beam from the first satellite to a second satellite of the one or more other satellites when the first satellite and the second satellite are at a first intersection of the transits that form the closed loop. For example, the antenna controller 220 switches the tracking target 222 from the first satellite 110A to the second satellite 110B when the first satellite 110A and the second satellite 110B are at the first intersection 104A. Switching the tracking target from the first satellite to the second satellite can be performed while the beam covers both of the first satellite and the second satellite at the first intersection, such as when the first satellite 110A and the second satellite 110B are within the beam coverage 130A at the first intersection 104A.

The method 1200 optionally includes, at block 1206, switching the tracking target of the beam from the second satellite to a third satellite of the one or more other satellites when the second satellite and the third satellite are at a second intersection of the transits that form the closed loop. For example, the antenna controller 220 switches the tracking target 222 from the second satellite 110B to the third satellite 110C when the second satellite 110B and the third satellite 110C are at the second intersection 104B.

The method 1200 optionally includes, at block 1208, switching the tracking target of the beam from the third satellite to the first satellite of the one or more other satellites when the third satellite and the first satellite are at the first intersection. For example, the antenna controller 220 switches the tracking target 222 from the third satellite 110C to the first satellite 110A when the third satellite 110C and the first satellite 110A are at the first intersection 104A.

The beam traces a path that continually follows the closed loop as a result of switching the tracking target, at each intersection of the transits that form the closed loop, from a satellite exiting the closed loop at that intersection to a satellite entering the closed loop at that intersection, such as described with reference to the path 122 of FIG. 2, and a communication link, such as the communication link 242, can be maintained via the beam. Handing off the communication link from satellites exiting the closed loop to satellites entering the closed loop, in conjunction with switching the tracking target of the beam, enables continuous polar coverage.

The method 1200 thus enables a terminal to maintain a communication link via a series of handoffs between satellites entering and leaving the closed loop. As a result, the method 1200 enables a ground terminal having a single-beam antenna to obtain continuous satellite coverage, which provides the technical advantage of improving satellite communication for such ground terminals as compared to conventional systems in which communications are interrupted when the single-beam antenna slews across the sky to locate a next satellite.

Figure 13:
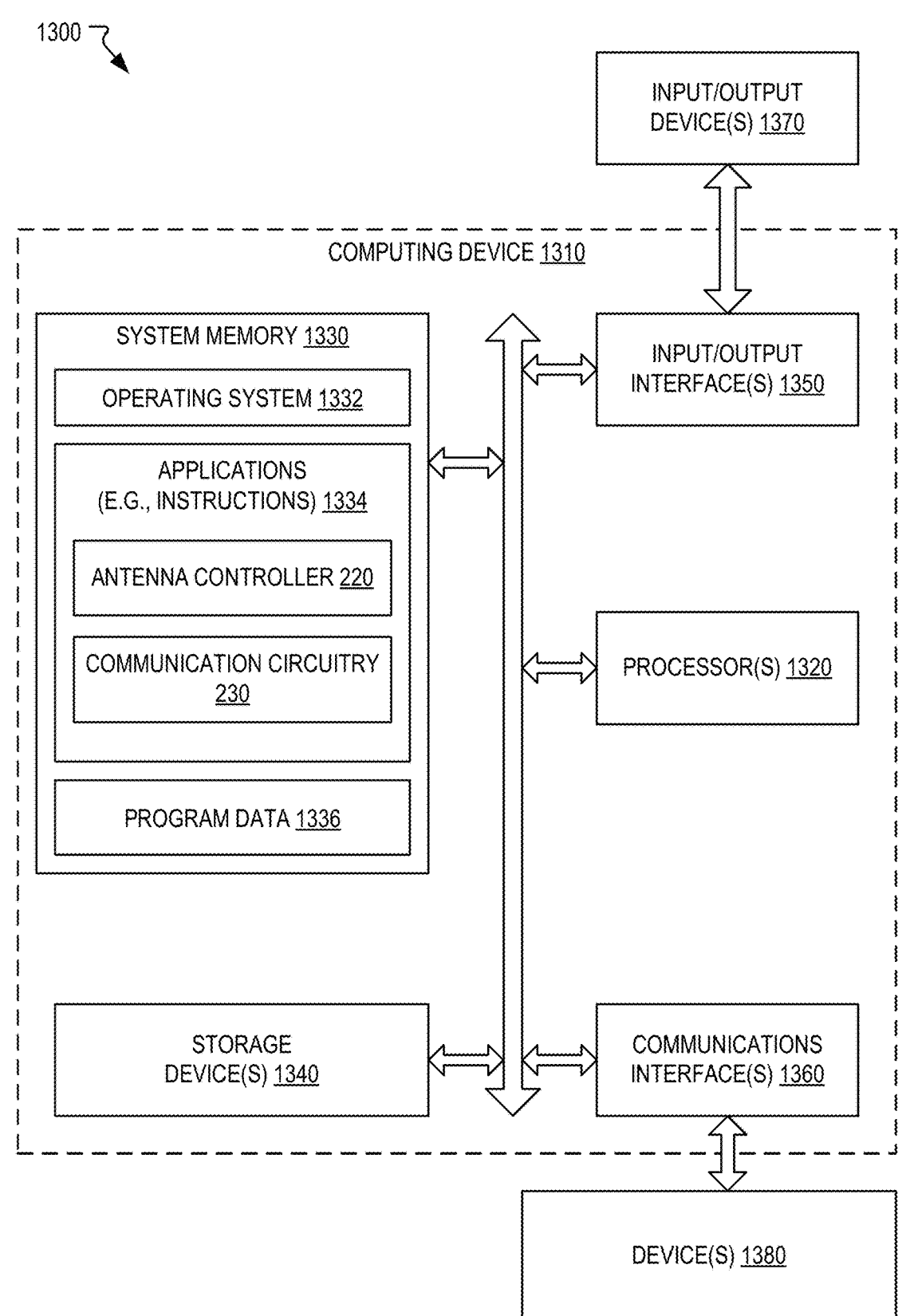
FIG. 13 is a block diagram of a computing environment including a computing device configured to support aspects of computer-implemented methods and computer-executable program instructions (or code) according to the present disclosure.

FIG. 13 is a block diagram of a computing environment 1300 including a computing device 1310 configured to support aspects of computer-implemented methods and computer-executable program instructions (or code) according to the present disclosure. For example, the computing device 1310, or portions thereof, is configured to execute instructions to initiate, perform, or control one or more operations described with reference to FIGS. 1-12.

The computing device 1310 includes the one or more processors 1320. The one or more processors 1320 are configured to communicate with system memory 1330, one or more storage devices 1340, one or more input/output interfaces 1350, one or more communications interfaces 1360, or any combination thereof. The system memory 1330 includes volatile memory devices (e.g., random access memory (RAM) devices), nonvolatile memory devices (e.g., read-only memory (ROM) devices, programmable read-only memory, and flash memory), or both. The system memory 1330 stores an operating system 1332, which may include a basic input/output system for booting the computing device 1310 as well as a full operating system to enable the computing device 1310 to interact with users, other programs, and other devices. The system memory 1330 stores system (program) data 1336, such as the tracking target 222, the handoff schedule 244, the closed loop satellite schedule 218, or a combination thereof. In a particular aspect, the system memory 1330 corresponds to the memory 214 of FIG. 2.

The system memory 1330 includes one or more applications 1334 (e.g., sets of instructions) executable by the one or more processors 1320. As an example, the one or more applications 1334 include instructions executable by the one or more processors 1320 to initiate, control, or perform one or more operations described with reference to FIGS. 1-12. To illustrate, the one or more applications 1334 include instructions executable by the one or more processors 1320 to initiate, control, or perform one or more operations described with reference to the antenna controller 220, the communication circuitry 230, or a combination thereof.

The system memory 1330 includes a non-transitory, computer readable medium storing the instructions that, when executed by the one or more processors 1320, cause the one or more processors 1320 to initiate, perform, or control operations that include directing a beam to track a first satellite that follows an orbit having a transit arranged to intersect a transit of one or more other satellites to form a closed loop, and switching a tracking target of the beam from the first satellite to a second satellite of the one or more other satellites when the first satellite and the second satellite are at a first intersection of the transits that form the closed loop.

The one or more storage devices 1340 include nonvolatile storage devices, such as magnetic disks, optical disks, or flash memory devices. In a particular example, the storage devices 1340 include both removable and non-removable memory devices. The storage devices 1340 are configured to store an operating system, images of operating systems, applications (e.g., one or more of the applications 1334), and program data (e.g., the program data 1336). In a particular aspect, the system memory 1330, the storage devices 1340, or both, include tangible computer-readable media. In a particular aspect, one or more of the storage devices 1340 are external to the computing device 1310.

The one or more input/output interfaces 1350 enable the computing device 1310 to communicate with one or more input/output devices 1370 to facilitate user interaction. For example, the one or more input/output interfaces 1350 can include a display interface, an input interface, or both. For example, the input/output interface 1350 is adapted to receive input from a user, to receive input from another computing device, or a combination thereof. The input/output interface 1350 may conform to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). The input/output device 1370 may include one or more user interface devices and displays, including some combination of buttons, keyboards, pointing devices, displays, speakers, microphones, touch screens, and other devices.

The one or more processors 1320 are configured to communicate with one or more devices 1380 via the one or more communications interfaces 1360. For example, the one or more communications interfaces 1360 can include a network interface. The one or more devices 1380 can include, for example, an antenna 202 responsive to the antenna controller 220.

In conjunction with the described systems and methods, a first apparatus is disclosed that includes means for generating control signals to cause a satellite to follow an orbit having a transit arranged to intersect a transit of one or more other satellites to form a closed loop and, at each intersection of the transits that form the closed loop, the satellite is distanced from another satellite in a manner that enables coverage by a single beam of an antenna that tracks the satellite as it travels along the closed loop. The means for generating the control signals corresponds to the satellite 110, the one or more processors 312, the satellite orbital controller 350A, the satellite control system 370, the one or more processors 372, the satellite orbital controller 350B, one or more other circuits or devices configured to generate control signals to cause the satellite to follow the orbit having a transit arranged to intersect a transit of one or more other satellites to form a closed loop and, at each intersection of the transits that form the closed loop, or a combination thereof.

The first apparatus also includes means for controlling communications according to a handoff schedule associated with the satellite entering or exiting the closed loop. The means for controlling communications corresponds to the satellite 110, the one or more processors 312, the satellite communication control system 340A, the satellite control system 370, the one or more processors 372, satellite communication control system 340B, one or more other circuits or devices configured to control communications according to a handoff schedule associated with the satellite entering or exiting the closed loop, or a combination thereof.

In conjunction with the described systems and methods, a second apparatus is disclosed that includes means for directing a beam to track a first satellite that follows an orbit having a transit arranged to intersect a transit of one or more other satellites to form a closed loop. The means for directing the beam corresponds to the device 210A, the device 210B, the one or more processors 212, the antenna controller 220, the ground-based antenna 202A, the air-based antenna 202B, one or more other circuits or devices configured to direct a beam to track a first satellite that follows an orbit having a transit arranged to intersect a transit of one or more other satellites to form a closed loop, or a combination thereof.

The second apparatus also includes means for switching a tracking target of the beam from the first satellite to a second satellite of the one or more other satellites when the first satellite and the second satellite are at a first intersection of the transits that form the closed loop. The means for switching the tracking target corresponds to the device 210A, the device 210B, the one or more processors 212, the antenna controller 220, the ground-based antenna 202A, the air-based antenna 202B, one or more other circuits or devices configured to switch a tracking target of the beam from the first satellite to a second satellite of the one or more other satellites when the first satellite and the second satellite are at a first intersection of the transits that form the closed loop, or a combination thereof.

A non-transitory, computer readable medium can store instructions that, when executed by one or more processors, cause the one or more processors to initiate, perform, or control operations to perform part or all of the functionality described above. For example, the instructions may be executable to implement one or more of the operations or methods of FIGS. 1-13. Part or all of one or more of the operations or methods of FIGS. 1-13 may be implemented by one or more processors (e.g., one or more central processing units (CPUs), one or more graphics processing units (GPUs), one or more neural processing units (NPUs), one or more digital signal processors (DSPs)) executing instructions, by dedicated hardware circuitry, or any combination thereof.

Particular aspects of the disclosure are described below in a first set of interrelated Examples:

According to Example 1, a system includes: a set of satellites in orbits having transits across the sky; wherein two or more such transits are arranged to intersect to form a closed loop; and wherein movement of the satellites along their respective transits causes, at each intersection of the closed loop, two or more satellites of the set of satellites to be distanced from each other in a manner that enables coverage of the two or more satellites by a single beam of an antenna that tracks one of the satellites.

Example 2 includes the system of Example 1, wherein the coverage by the single beam of an antenna enables handoff of a communication link from one of the satellites to another of the satellites at an intersection of the transits without discontinuity.

Example 3 includes the system of Example 1 or Example 2, wherein handoffs between satellites at the intersections of the closed loop enable a substantially continuous communication link to be maintained perpetually throughout a multi-year life of the system.

Example 4 includes the system of any of Examples 1 to 3, wherein the antenna is a ground-based antenna or an air-based antenna.

Example 5 includes the system of any of Examples 1 to 4, wherein the set of satellites includes three satellites, and wherein the two or more transits form an eye-shaped closed loop.

Example 6 includes the system of any of Examples 1 to 5, wherein the antenna maintains a substantially continuous communication link by tracking each of the satellites from entry into the eye-shaped closed loop at a first intersection to exit from the eye-shaped closed loop at a second intersection.

Example 7 includes the system of any of Examples 1 to 6, wherein: a communication link with a first satellite of the three satellites is handed off to a second satellite of the three satellites at a first intersection of the eye-shaped closed loop; upon the second satellite and a third satellite of the three satellites entering a second intersection of the eye-shaped closed loop, the communication link is handed off from the second satellite to the third satellite; and upon the third satellite and the first satellite entering the first intersection of the eye-shaped closed loop, the communication link is handed off from the third satellite to the first satellite.

According to Example 8, a device includes: a satellite orbital controller configured to generate control signals to cause a satellite to follow an orbit having a transit arranged to intersect a transit of one or more other satellites to form a closed loop and, at each intersection of the transits that form the closed loop, the satellite is distanced from another satellite in a manner that enables coverage by a single beam of an antenna that tracks the satellite as it travels along the closed loop; and a satellite communication control system configured to control communications according to a handoff schedule associated with the satellite entering or exiting the closed loop.

Example 9 includes the device of Example 8, wherein the satellite communication control system is configured to, upon the satellite exiting the closed loop at a first intersection, perform handoff of a communication link from the satellite to a second satellite that enters the closed loop at the first intersection.

Example 10 includes the device of Example 8 or Example 9, wherein the satellite communication control system is further configured to, prior to performing the handoff to the second satellite, establish the communication link upon the satellite entering the closed loop at a second intersection and via a handoff of the communication link from a third satellite that exits the closed loop at the second intersection.

Example 11 includes the device of any of Examples 8 to 10, wherein the closed loop corresponds to an eye-shaped closed loop formed by transits of the satellite, the second satellite, and the third satellite.

Example 12 includes the device of any of Examples 8 to 11, wherein communication link handoffs between satellites at the intersections enable the antenna to maintain a substantially continuous communication link by tracking each of the satellites from an entry into the closed loop to an exit from the closed loop.

Example 13 includes the device of any of Examples 8 to 12, wherein the satellite orbital controller and the satellite communication control system are integrated in the satellite.

Example 14 includes the device of any of Examples 8 to 13, further including a satellite propulsion system integrated in the satellite and responsive to the control signals.

Example 15 includes the device of any of Examples 8 to 12, wherein the satellite orbital controller is included in an air-based or ground-based system.

According to Example 16, a method of providing polar coverage includes: causing a second satellite of a set of satellites in orbits having transits across the sky to receive a handoff of a communication link from a first satellite of the set of satellites, wherein the transits are arranged to intersect to form a closed loop and wherein the communication link is handed off upon the first satellite exiting the closed loop at a first intersection and the second satellite entering the closed loop at the first intersection; and causing the second satellite to hand off the communication link to a third satellite of the set of satellites upon the second satellite exiting the closed loop at a second intersection and the third satellite entering the closed loop at the second intersection.

Example 17 includes the method of Example 16, wherein, at the first intersection, the first satellite is distanced from the second satellite in a manner that enables coverage of the first satellite and the second satellite by a single beam of an antenna that carries the communication link.

Example 18 includes the method of Example 16 or Example 17, wherein the coverage by the single beam of an antenna enables handoff of a communication link from one of the satellites to another of the satellites at an intersection of the transits without discontinuity.

Example 19 includes the method of any of Examples 16 to 18, wherein the antenna is a ground-based antenna or an air-based antenna.

Example 20 includes the method of any of Examples 16 to 19, wherein the antenna maintains a substantially continuous communication link by tracking each of the satellites of the set of satellites from entering into the closed loop to exiting from the closed loop.

Example 21 includes the method of any of Examples 16 to 20, further including: causing the first satellite to hand off the communication link to the second satellite when the first satellite and the second satellite are at the first intersection; and causing the third satellite to receive the handoff of the communication link from the second satellite when the first satellite and the third satellite are at the second intersection.

Example 22 includes the method of any of Examples 16 to 21, further including, after the third satellite receives the communication link from the second satellite at the second intersection, causing the third satellite to hand off the communication link to the first satellite when the third satellite and the first satellite are at the first intersection.

Example 23 includes the method of any of Examples 16 to 22, wherein the communication link is maintained in a substantially continuous manner by the first satellite, the second satellite, and the third satellite according to a handoff schedule associated with each of the first satellite, the second satellite, and the third satellite entering or exiting the closed loop.

Example 24 includes the method of any of Examples 16 to 23 wherein handoffs between satellites at the intersections of the closed loop enable a substantially continuous communication link to be maintained perpetually throughout a multi-year life of the system.

Example 25 includes the method of any of Examples 16 to 24, wherein the set of satellites includes three satellites, and wherein the transits form an eye-shaped closed loop.

According to Example 26, a device includes: a memory configured to store instructions; and a processor configured to execute the instructions to perform the method of any of Examples 16 to 25.

According to Example 27, a non-transitory computer-readable medium stores instructions that, when executed by a processor, cause the processor to perform the method of any of Examples 16 to 25.

According to Example 28, an apparatus includes means for carrying out the method of any of Examples 16 to 25.

According to Example 29, a device includes: an antenna controller configured to: direct a beam to track a first satellite that follows an orbit having a transit arranged to intersect a transit of one or more other satellites to form a closed loop; and switch a tracking target of the beam from the first satellite to a second satellite of the one or more other satellites when the first satellite and the second satellite are at a first intersection of the transits that form the closed loop.

Example 30 includes the device of Example 29, wherein the antenna controller is further configured to switch the tracking target of the beam from the second satellite to a third satellite of the one or more other satellites when the second satellite and the third satellite are at a second intersection of the transits that form the closed loop.

Example 31 includes the device of Example 29 or Example 30, wherein the antenna controller is further configured to switch the tracking target of the beam from the third satellite to the first satellite of the one or more other satellites when the third satellite and the first satellite are at the first intersection.

Example 32 includes the device of any of Examples 29 to 31, wherein the closed loop corresponds to an eye-shaped closed loop.

Example 33 includes the device of any of Examples 29 to 32, wherein the antenna controller is configured to switch the tracking target while the beam covers both of the first satellite and the second satellite at the first intersection.

Example 34 includes the device of any of Examples 29 to 33, wherein the antenna controller is configured to cause the beam to trace a path that continually follows the closed loop as a result of switching the tracking target, at each intersection of the transits that form the closed loop, from a satellite exiting the closed loop at that intersection to a satellite entering the closed loop at that intersection.

Example 35 includes the device of any of Examples 29 to 34, further including an antenna responsive to the antenna controller.

Example 36 includes the device of any of Examples 29 to 35, further including communication circuitry configured to maintain a communication link via the beam.

Example 37 includes the device of any of Examples 29 to 36, wherein handing off the communication link from satellites exiting the closed loop to satellites entering the closed loop, in conjunction with switching the tracking target of the beam, enables continuous satellite coverage.

According to Example 38, a method of obtaining polar coverage includes: directing, at an antenna controller, a beam to track a first satellite that follows an orbit having a transit arranged to intersect a transit of one or more other satellites to form a closed loop; and switching, at the antenna controller, a tracking target of the beam from the first satellite to a second satellite of the one or more other satellites when the first satellite and the second satellite are at a first intersection of the transits that form the closed loop.

Example 39 includes the method of Example 38, further including switching the tracking target of the beam from the second satellite to a third satellite of the one or more other satellites when the second satellite and the third satellite are at a second intersection of the transits that form the closed loop.

Example 40 includes the method of Example 38 or Example 39, further including switching the tracking target of the beam from the third satellite to the first satellite of the one or more other satellites when the third satellite and the first satellite are at the first intersection.

Example 41 includes the method of any of Examples 38 to 40, wherein the closed loop corresponds to an eye-shaped closed loop.

Example 42 includes the method of any of Examples 38 to 41, wherein switching the tracking target from the first satellite to the second satellite is performed while the beam covers both of the first satellite and the second satellite at the first intersection.

Example 43 includes the method of any of Examples 38 to 42, wherein the beam traces a path that continually follows the closed loop as a result of switching the tracking target, at each intersection of the transits that form the closed loop, from a satellite exiting the closed loop at that intersection to a satellite entering the closed loop at that intersection.

Example 44 includes the method of any of Examples 38 to 43, further including maintaining a communication link via the beam.

Example 45 includes the method of any of Examples 38 to 44, wherein handing off the communication link from satellites exiting the closed loop to satellites entering the closed loop, in conjunction with switching the tracking target of the beam, enables continuous polar coverage.

According to Example 46, a device includes: a memory configured to store instructions; and a processor configured to execute the instructions to perform the method of any of Examples 38 to 45.

According to Example 47, a non-transitory computer-readable medium stores instructions that, when executed by a processor, cause the processor to perform the method of any of Examples 38 to 45.

According to Example 48, an apparatus includes means for carrying out the method of any of Examples 38 to 45.

According to Example 49, a non-transitory computer-readable medium includes instructions that, when executed by one or more processors, cause the one or more processors to: direct a beam to track a first satellite that follows an orbit having a transit arranged to intersect a transit of one or more other satellites to form a closed loop; and switch a tracking target of the beam from the first satellite to a second satellite of the one or more other satellites when the first satellite and the second satellite are at a first intersection of the transits that form the closed loop.

Example 50 includes the non-transitory computer-readable medium of Example 49, wherein the instructions are further executable to cause the one or more processors to maintain a communication link via the beam.

Example 51 includes the non-transitory computer-readable medium of Example 49 or Example 50, wherein handing off the communication link from satellites exiting the closed loop to satellites entering the closed loop, in conjunction with switching the tracking target of the beam, enables continuous polar coverage.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A system comprising:
a set of satellites in orbits having transits across a sky;
wherein two or more such transits are arranged to intersect to form an eye-shaped closed loop; and
wherein movement of the satellites along their respective transits causes, at each intersection of the eye-shaped closed loop, two or more satellites of the set of satellites to be distanced from each other in a manner that enables coverage of the two or more satellites by a single beam of an antenna and enables the antenna to maintain a substantially continuous communication link by tracking each of the satellites from entry into the eye-shaped closed loop at a first intersection to exit from the eye-shaped closed loop at a second intersection.

2. The system of claim 1, wherein the coverage by the single beam of the antenna enables handoff of a communication link from one of the satellites to another of the satellites at an intersection of the transits without discontinuity.

3. The system of claim 1, wherein handoffs between satellites at the intersections of the eye-shaped closed loop enable a substantially continuous communication link to be maintained continuously throughout a multi-year life of the system.

4. The system of claim 1, wherein the antenna is a ground-based antenna or an air-based antenna.

5. The system of claim 1, wherein the satellites in the eye-shaped closed loop have an apogee altitude that is approximately the same altitude as geostationary orbit to enable satellites designed for geostationary orbit to be used without substantial redesign.

6. The system of claim 1, wherein the antenna switches a tracking target from a satellite exiting the eye-shaped closed loop at an intersection to a satellite entering the eye-shaped closed loop at the intersection while the single beam of the antenna covers both satellites at the intersection.

7. The system of claim 1, wherein:
a communication link with a first satellite is handed off to a second satellite at a first intersection of the eye-shaped closed loop;
upon the second satellite and a third satellite entering a second intersection of the eye-shaped closed loop, the communication link is handed off from the second satellite to the third satellite; and
upon the third satellite and the first satellite entering the first intersection of the eye-shaped closed loop, the communication link is handed off from the third satellite to the first satellite.

8. A device comprising:
a satellite orbital controller configured to generate control signals to cause a satellite to follow an orbit having a transit arranged to intersect a transit of one or more other satellites to form a closed loop and, at each intersection of the transits that form the closed loop, the satellite is distanced from another satellite in a manner that enables coverage by a single beam of an antenna that tracks the satellite as it travels along the closed loop; and
a satellite communication control system configured to control communications according to a handoff schedule associated with the satellite entering or exiting the closed loop.

9. The device of claim 8, wherein the satellite communication control system is configured to, upon the satellite exiting the closed loop at a first intersection, perform handoff of a communication link from the satellite to a second satellite that enters the closed loop at the first intersection.

10. The device of claim 9, wherein the satellite communication control system is further configured to, prior to performing the handoff to the second satellite, establish the communication link upon the satellite entering the closed loop at a second intersection and via a handoff of the communication link from a third satellite that exits the closed loop at the second intersection.

11. The device of claim 10, wherein the closed loop corresponds to an eye-shaped closed loop formed by transits of the satellite, the second satellite, and the third satellite.

12. The device of claim 8, wherein communication link handoffs between satellites at the intersections enable the antenna to maintain a substantially continuous communication link by tracking each of the satellites from an entry into the closed loop to an exit from the closed loop.

13. The device of claim 8, wherein the satellite orbital controller and the satellite communication control system are integrated in the satellite.

14. The device of claim 13, further comprising a satellite propulsion system integrated in the satellite and responsive to the control signals.

15. The device of claim 8, wherein the satellite orbital controller is included in an air-based or ground-based system.

16. A method of providing polar coverage comprising:

causing a second satellite of a set of satellites in orbits having transits across a sky to receive a handoff of a communication link from a first satellite of the set of satellites, wherein the transits are arranged to intersect to form a closed loop and wherein the communication link is handed off upon the first satellite exiting the closed loop at a first intersection and the second satellite entering the closed loop at the first intersection; and causing the second satellite to hand off the communication link to a third satellite of the set of satellites upon the second satellite exiting the closed loop at a second intersection and the third satellite entering the closed loop at the second intersection.

17. The method of claim 16, wherein, at the first intersection, the first satellite is distanced from the second satellite in a manner that enables coverage of the first satellite and the second satellite by a single beam of an antenna that carries the communication link.

18. The method of claim 16, further comprising:

causing the first satellite to hand off the communication link to the second satellite when the first satellite and the second satellite are at the first intersection; and causing the third satellite to receive the handoff of the communication link from the second satellite when the first satellite and the third satellite are at the second intersection.

19. The method of claim 18, further comprising, after the third satellite receives the communication link from the second satellite at the second intersection, causing the third satellite to hand off the communication link to the first satellite when the third satellite and the first satellite are at the first intersection.

20. The method of claim 16, wherein the communication link is maintained in a substantially continuous manner by the first satellite, the second satellite, and the third satellite according to a handoff schedule associated with each of the first satellite, the second satellite, and the third satellite entering or exiting the closed loop.

\* \* \* \* \*